US011675620B2

(12) United States Patent
Dobrev

(10) Patent No.: US 11,675,620 B2
(45) Date of Patent: *Jun. 13, 2023

(54) METHODS AND APPARATUS TO AUTOMATE DEPLOYMENTS OF SOFTWARE DEFINED DATA CENTERS BASED ON AUTOMATION PLAN AND USER-PROVIDED PARAMETER VALUES

(71) Applicant: VMware, Inc., Palo Alto, CA (US)

(72) Inventor: Pavel Mitkov Dobrev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/687,267

(22) Filed: Nov. 18, 2019

(65) Prior Publication Data

US 2020/0159573 A1 May 21, 2020

Related U.S. Application Data

(63) Continuation of application No. 15/373,831, filed on Dec. 9, 2016, now Pat. No. 10,481,949.

(51) Int. Cl.
*G06F 9/48* (2006.01)
*G06F 8/60* (2018.01)
(Continued)

(52) U.S. Cl.
CPC ............. *G06F 9/4881* (2013.01); *G06F 8/38* (2013.01); *G06F 8/60* (2013.01); *G06F 9/45558* (2013.01);
(Continued)

(58) Field of Classification Search
None
See application file for complete search history.

(56) References Cited

U.S. PATENT DOCUMENTS 8,171,485 B2   5/2012 Muller
8,826,289 B2   9/2014 Muller
(Continued)

FOREIGN PATENT DOCUMENTS

WO   2008118464   10/2008
WO   2016086991   6/2016

OTHER PUBLICATIONS

International Searching Authority, "International Search Report and Written Opinion," issued in connection with International Patent Application No. PCT/US2017/065193, dated Mar. 21, 2018, 12 pages.
(Continued)

*Primary Examiner* — Meng Ai T An
*Assistant Examiner* — Zujia Xu
(74) *Attorney, Agent, or Firm* — Hanley, Flight and Zimmerman, LLC

(57) ABSTRACT

A disclosed example method to automate deployment of a software defined data center includes generating, by executing an instruction with at least one processor, a task list based on tasks provided in an automation plan to deploy the software defined data center; determining, by executing an instruction with the at least one processor, dependencies between the tasks prior to executing the tasks; determining, by executing an instruction with the at least one processor, whether a resource that is to be an output of a first one of the tasks exists before execution of the first one of the tasks; removing, by executing an instruction with the at least one processor, the first one of the tasks from the task list when the resource exists before execution of the first one of the tasks; generating an execution schedule, by executing an instruction with the at least one processor, based on the dependencies and ones of the tasks remaining in the task list; and executing, with the at least one processor, the ones of the
(Continued)

tasks based on the execution schedule to deploy the software defined data center.

22 Claims, 23 Drawing Sheets

(51) Int. Cl.
*G06F 9/455* (2018.01)
*G06F 8/38* (2018.01)
*G06F 9/50* (2006.01)

(52) U.S. Cl.
CPC .... *G06F 9/5038* (2013.01); *G06F 2009/4557* (2013.01); *G06F 2009/45562* (2013.01)

(56) References Cited

U.S. PATENT DOCUMENTS

| | | | |
|---|---|---|---|
| 9,529,613 | B2 | 12/2016 | Muller et al. |
| 9,652,267 | B2 | 5/2017 | Muller |
| 9,851,989 | B2 | 12/2017 | Muller et al. |
| 10,481,949 | B2 | 11/2019 | Dobrev |
| 2005/0257200 | A1* | 11/2005 | Taylor ............... G06F 30/34 717/136 |
| 2012/0047239 | A1 | 2/2012 | Donahue et al. |
| 2013/0232480 | A1* | 9/2013 | Winterfeldt ............ G06F 8/60 717/177 |
| 2013/0232498 | A1 | 9/2013 | Mangtani et al. |
| 2014/0040343 | A1 | 2/2014 | Nickolov et al. |
| 2014/0181817 | A1 | 6/2014 | Muller et al. |
| 2015/0052530 | A1 | 2/2015 | Jacobson et al. |
| 2015/0074659 | A1 | 3/2015 | Madsen et al. |
| 2015/0095917 | A1 | 4/2015 | Challenger et al. |
| 2015/0193150 | A1 | 7/2015 | Kura et al. |
| 2015/0242237 | A1 | 8/2015 | Spivak et al. |
| 2015/0350101 | A1 | 12/2015 | Sinha et al. |
| 2016/0034475 | A1 | 2/2016 | Manoochehri et al. |
| 2016/0094483 | A1 | 3/2016 | Johnston et al. |
| 2016/0239280 | A1 | 8/2016 | Scheiner et al. |
| 2017/0315845 | A1* | 11/2017 | Fisher ................ G06F 9/5038 |
| 2017/0364342 | A1 | 12/2017 | Shuster et al. |
| 2018/0136931 | A1 | 5/2018 | Hendrich et al. |

OTHER PUBLICATIONS

Gnome Developer, "Chapters. Script," [https://web.archive.org/web/20150918102303/https://developer.gnome.org/clutter-cookbook/stable/script.html], retrieved Dec. 6, 2018, 5 pages.

United States Patent and Trademark Office, "Non-Final Office Action," issued in connection with U.S. Appl. No. 15/373,831, dated Jun. 28, 2018, 22 pages.

United States Patent and Trademark Office, "Final Office Action," issued in connection with U.S. Appl. No. 15/373,831, dated Dec. 14, 2018, 24 pages.

United States Patent and Trademark Office, "Advisory Action," issued in connection with U.S. Appl. No. 15/373,831, dated Mar. 11, 2019, 3 pages.

United States Patent and Trademark Office, "Notice of Allowance," issued in connection with U.S. Appl. No. 15/373,831, dated Jul. 3, 2019, 15 pages.

International Searching Authority, "International Preliminary Report on Patentability," mailed in connection with International Patent Application No. PCT/US2017/065193, dated Jun. 11, 2019, 7 pages.

* cited by examiner

PRODUCT SELECTION USER INTERFACE

RUN PARAMETERS CONFIGURATION USER INTERFACE

AUTOMATED DEPLOYMENT STATUS USER INTERFACE

| | | | | |
|---|---|---|---|---|
| › vROps ADAPTER FOR NSX | | | | |
| › vROps ADAPTER FOR STORAGE DEVICE | | | | |
| › vROps ADAPTER FOR vRA | | | | |
| › vSPHERE DATA PROTECTION | | | | |
| › vREALIZE AUTOMATION | | | | |
| ⌄ vREALIZE ORCHESTRATION | | | | |
| VERSION 7.0.1 BUILD: OB-3571217 | | | | |
| › COMMON OPERATIONS | | | | |
| › vRO (NODE 2) | | | | |
| ⌄ vRO (NODE 1) | | | | |

| OPERATION DESCRIPTION | START TIME | DURATION | PHASE | STATUS | ERROR MESSAGE |
|---|---|---|---|---|---|
| DEPLOY vRO | 2016-09-21 10:54 | 2 h 25m | DEPLOY | FAILURE | CANNOT DEPLOY VM VRO-1-DEPLOYMENT. CAUSE BY: RETRIABLE OPERATION 'DEPLOY VM 'VRO-1-DEPLOYMENT'' FAILED TO COMPLETE AFTER 2 RETRIES. CAUSED BY: CANNOT VALIDATE DEPLOYMENT VRO-1-DEPLOYMENT, CHECK THE LOG FOR ADDITIONAL ERRORS |
| CONFIGURE vRO NODES | | | CONFIGURE | SKIPPED | OPERATION SKIPPED BECAUSE IT DEPENDS ON FAILED OPERATION 'DEPLOY vRO NODE' (VRO-1-DEPLOYMENT) |
| CONFIGURE LOG FILES ROTATION | | | CONFIGURE | SKIPPED | OPERATION SKIPPED BECAUSE IT DEPENDS ON FAILED OPERATION 'DEPLOY vRO NODE' (VRO-1-DEPLOYMENT) |
| CONFIGURE CRONTAB | | | CONFIGURE | SKIPPED | OPERATION SKIPPED BECAUSE IT DEPENDS ON FAILED OPERATION 'DEPLOY vRO NODE' (VRO-1-DEPLOYMENT) |

TROUBLESHOOTING USER INTERFACE

FIG. 10

AUTOMATION PLAN EXECUTION PHASE

AUTOMATION PLAN EXECUTION PHASE

```
"prompt":"Clean ESX hosts",
    "type":"BOOLEAN"
},{
    "key":"deployVsan",
    "type":"BOOLEAN"
},{
    "key":"useSelfSignedCertificates",
    "type":"BOOLEAN"
},{
    "key":"domainName",
    "prompt":"The name of the domain, if you want to use a custom domain name, the AD template should be altered and new custom LDAP identity source should be provided",
    "type":"STRING",
    "defaultValue":"rainpole.local"
},{
    "key":"addIdentitySourceToMgmtPsc",
    "prompt":"Add identity source to management PSC (should be true for mgmt PSC on primary site)",
    "type":"BOOLEAN"
},{
    "key":"hostnamesSuffix",
    "prompt":"The suffix that is added to the ESX hostnames - should be '0' for primary and '5' for recovery site",
    "type":"STRING",
    "required":"true"
},{
    "key":"mgmtVCenterSize",
    "prompt":"The size of the Management vCenter",
    "type":"STRING"
},{
    "key":"pscModeManagementVC",
    "prompt":"PSC deployment mode for Management vCenter Server",
    "type":"ENUM",
    "acceptedValues":["external", "embedded"],
    "defaultValue":"external"
},{
    "key":"externalPscId",
    "prompt":"Instance ID of the external PSC setup",
    "type":"STRING",
    "defaultValue":"psc-vcenter-mgmt"
},{
    "key":"loadBalancedPscSetup",
    "type":"BOOLEAN",
    "defaultValue":false
}
],
"defaultResources":[
{
    "type":"com.vmware.suite.automation.resources.StringResource",
    "instanceId":"migrate-physical-nics-from-vss-to-mgmt-vds",
    "value":"true"
},{
    "type":"com.vmware.suite.automation.resources.StringResource",
    "instanceId":"replication-folder",
    "value":""
},{
    "type" : "com.vmware.suite.automation.resources.NtpServer",
    "instanceId" : "remote-site-ntp-server",
    "address" : ""
},{
    "type":"com.vmware.suite.automation.resources.StringResource",
    "instanceId":"management-cluster-name",
    "value":"SFO01-Mgmt01"
},{
    "type":"com.vmware.suite.automation.resources.StringResource",
    "instanceId":"management-vsan-datastore-name",
    "value":"SFO01A-VSAN01-MGMT01"
},{
    "type" : "com.vmware.suite.automation.resources.StringResource",
    "instanceId" : "evc-mode-management-cluster",
```

FIG. 20

METHODS AND APPARATUS TO AUTOMATE DEPLOYMENTS OF SOFTWARE DEFINED DATA CENTERS BASED ON AUTOMATION PLAN AND USER-PROVIDED PARAMETER VALUES

RELATED APPLICATION

This patent arises from a continuation of U.S. patent application Ser. No. 15/373,831, (Now U.S. Pat. No. 10,481,949 which was filed on Dec. 9, 2016, and entitled "METHODS AND APPARATUS TO AUTOMATE DEPLOYMENTS OF SOFTWARE DEFINED DATA CENTERS." U.S. patent application Ser. No. 15/373,831 is hereby incorporated herein by reference in its entirety. Priority to U.S. patent application Ser. No. 15/373,831 is hereby claimed.

FIELD OF THE DISCLOSURE

The present disclosure relates generally to cloud computing and, more particularly, to methods and apparatus to automate deployments of software defined data centers.

BACKGROUND

Virtualizing computer systems provide benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

FIG. 10 illustrates an example troubleshooting user interface that may be used to diagnose failures during the automated deployment of the SDDC.

FIG. 20 shows example programming language in an automation plan configuration file that defines graphical user interface controls and default values to specify parameter values for user-configurable parameters.

DETAILED DESCRIPTION

Figure 1:
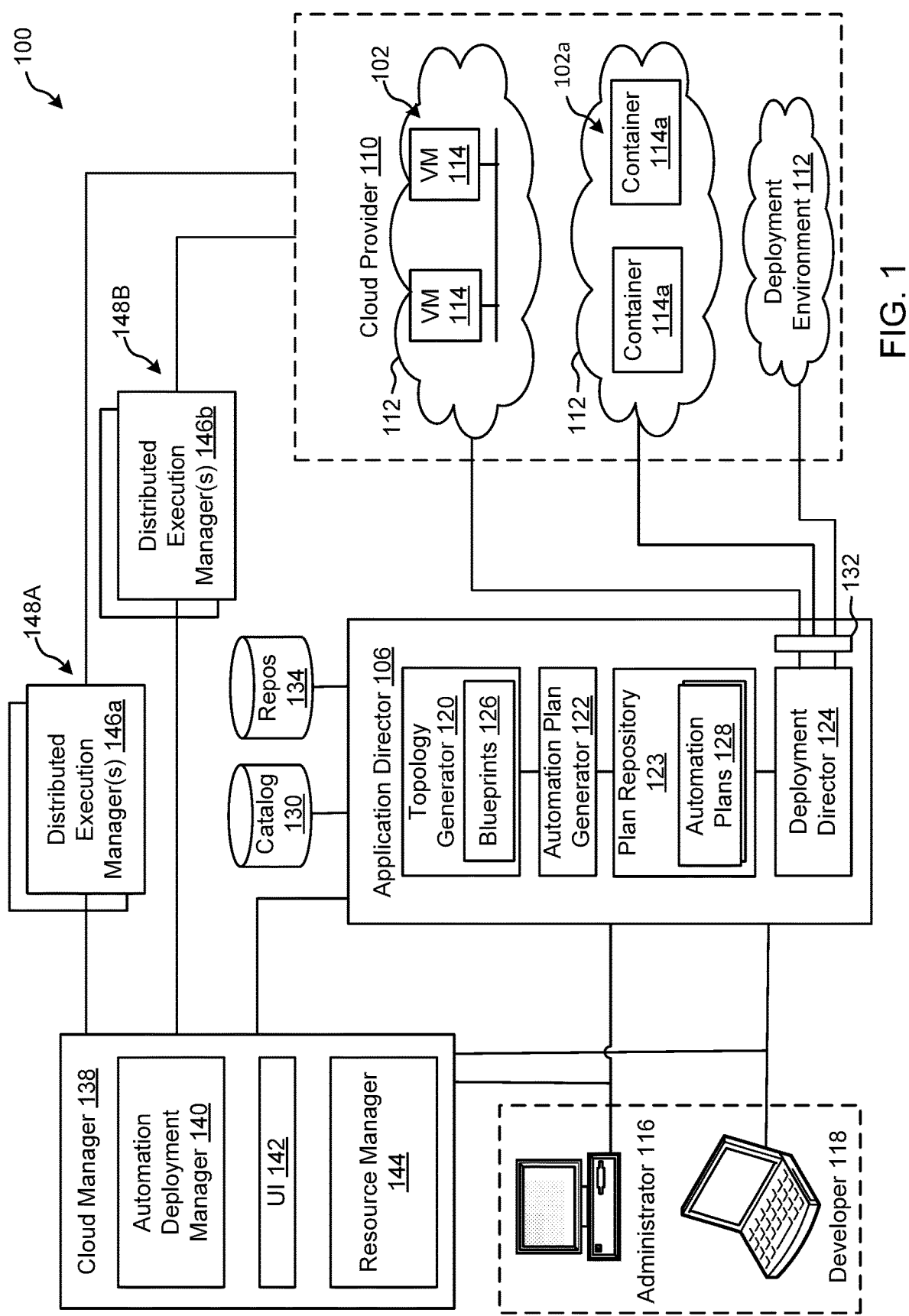
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all of which are hereby incorporated herein by reference in their entireties.

Cloud computing platforms may provide many powerful capabilities for performing computing operations. However, taking advantage of these computing capabilities manually may be complex and/or require significant training and/or expertise. Prior techniques for providing cloud computing platforms and services often require customers to understand details and configurations of hardware and software resources to establish and configure the cloud computing platform. Methods and apparatus disclosed herein enable automatic deployment, configuration, and management of software defined data centers and virtual machine resources in cloud computing platforms.

A software defined data center (SDDC) is a data storage facility implemented using an infrastructure that is virtualized and delivered as a service to one or more customers. After deployment of a SDDC, the SDDC provides policy-driven automation to enable provisioning and ongoing management of logical compute resources, storage resources, and network resources. For example, customers may select/create policies that cause the SDDC to deploy applications quickly based on policy-driven provisioning that dynamically matches resources to continually changing workloads and business demands. An SDDC can be deployed as a private cloud, a hybrid cloud, or a public cloud and can run on multiple hardware stacks, hypervisors, and clouds.

A virtual machine (VM) is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein enable automatic deployment, configuration, and management of SDDCs and virtual machine resources in cloud computing platforms. The improvements to cloud management systems (e.g., the vCloud Automation Center™ (vCAC) from VMware®, the vRealize® Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environments are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., a VMware ESXi™ hypervisor) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a SDDC (or a pool of linked SDDCs) may include multiple different virtualization environments. For example, a SDDC may include hardware resources that are managed by a full virtualization environment, a paravirtualization environment, and an operating system virtualization environment. In such a SDDC, a workload may be deployed to any of the virtualization environments.

Prior tools available to customers for deploying, configuring, and managing SDDCs involve using low-level programming languages that require customers to use skilled programmers to generate thousands or tens of thousands of programming lines of code (LOCs) to implement an SDDC deployment that meets the customer's requirements. Prior tools for defining SDDC deployments are based on general, low-level domain specific languages (DSLs) that allow fine granular programming for significant customization of deployment features. However, such DSLs lack higher-level primitives, programming components, or building blocks to more quickly deploy SDDCs and to allow less-skilled programmers or users to define deployments while achieving the same high-quality functionality as is achievable using lower-level DSLs programmed by highly skilled programmers.

Deploying an SDDC manually without using any automation tools could take an end-user customer 30-40 days. For an end-user customer to develop an automation tool, it would take several months to multiple years. As such, using prior techniques for end-user customers to deploy SDDCs requires more time than using examples disclosed herein. Examples disclosed herein create more efficient task execution for deployments (e.g., deploying a virtual stack for an SDDC) in an automated manner by automatically arranging tasks to provide significant performance improvements over prior techniques. For example, examples disclosed herein cause tasks to be executed in parallel whenever such parallelization opportunities exist, rather than executing them sequentially (e.g., as would be done using a (shell) script or using a prior automation tool). Examples disclosed herein also automatically exclude execution of some tasks that are unnecessary during some deployments as described below.

Some prior custom automation tools have built-in SDDC designs. Changing such designs requires changes in the underlying programming code of the custom automation tool. Unlike those prior techniques, examples disclosed herein provide higher-level primitives that allow end-user customers to change a deployment design instantly without changing the underlying programming code that defines the tasks and resources of the deployment. For example, if an end-user customer wants four central virtualization management nodes (e.g., four VMware vCenter® nodes) in a linked mode, with a four-node platform services controller (PSC) cluster, examples disclosed herein enable accomplishing this by editing user-configurable parameters in configuration files (e.g., JSON configuration files) of an automation plan using user-provided parameter values without needing to recompile the underlying programming code. In some examples, higher-level primitives provided by examples disclosed herein can be implemented to match concepts (e.g., high-level primitives for resource abstraction, resource pooling, and/or resource automation) defined in SDDC stacks from different vendors (e.g., a VMware SDDC stack). In this manner, an end-user customer (e.g., a system architect) can work with SDDC concepts, rather than needing to work at a system-administrator level where a significant amount of low-level programming is required to deploy and configure particular services to get an entire stack up and running.

Unlike prior deployment tools that provide low-level DSLs, examples disclosed herein provide a higher-level DSL for use by customers to more quickly and more easily deploy and configure SDDCs and/or virtual appliances using higher-level primitives, programming components, or building blocks than available from such prior lower-level DSLs. For example, instead of coding thousands of LOCs, a customer may use examples disclosed herein to specify deployments of products based on higher-level primitives representing requests such as: "I want to deploy a SDDC," "I want to setup an enterprise solutions repository," "I want to configure the enterprise solutions repository to be fully functional," "I want to setup virtual automation manager nodes," "I want to setup mobile access," "I want to setup multiple network virtualization instances," etc.

In examples disclosed herein, the higher-level DSL is provided to customers in the form of automation plans that allow customers (e.g., customers of an IaaS service provider) to customize SDDC and/or virtual appliance deployments to satisfy the requirements of those customers. For example, the automation plans include customizable resource and task definitions that are configurable by customers. In this manner, after a customer is finished providing user-provided parameter values for user-configurable parameters of the automation plan, the automation plan in combination with the user-provided parameter values are used to automatically deploy a corresponding SDDC and/or virtual appliance(s). Using such customizable automation plans, a customer can fully deploy an SDDC to full running status in 9 hours or, in some instances, as few as 3-5 hours, which are significantly shorter deployment times than the longer deployment times of 30-40 days associated with deploying an SDDC manually without using any automation tools.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. The application director 106 and the cloud manager 138 of the illustrated example are executed by one or more server nodes of a data center (e.g., one or more host servers in a physical rack of a data center). As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter Services® for cloud computing available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes an example topology generator 120, an example automation plan generator 122, an example plan repository, and an example deployment director 124.

The example topology generator 120 generates an example customer-customizable deployment blueprint 126 that specifies a customizable logical topology of a SDDC and/or an application to be deployed. The example customer-customizable deployment blueprint 126 is designed by the developer 118 or programmer of an IaaS service provider for use by one or more customers to deploy SDDCs and/or virtual appliances. The example customer-customizable deployment blueprint 126 generally captures a customizable structure of a SDDC and/or an application as a collection of user-configurable components to execute on user-customizable virtual computing resources. For example, the customer-customizable deployment blueprint 126 generated by the example topology generator 120 for an online store application may specify a user-configurable number and/or type(s) of web applications (e.g., in the form of a Java web application archive or "WAR" file including dynamic web pages, static web pages, Java servlets, Java classes, and/or other property, configuration and/or resources files that make up a Java web application) that can execute on a user-configurable number and/or type(s) of application servers (e.g., an Apache Tomcat application server) that use(s) a user-configurable number and/or type(s) of databases (e.g., MongoDB) as a data store.

As used herein, the term "application" generally refers to a logical deployment unit, including one or more application packages and their dependent middleware and/or operating systems. Applications may be distributed across multiple VMs. Thus, in the example described above, the term "application" refers to the entire online store application, including web application, application server, and database components, rather than just the web application itself. In some instances, the application may include default requirements and/or user-configurable requirements for underlying hardware resources and/or virtual computing hardware utilized to implement the components of the application.

The example customer-customizable deployment blueprint 126 of FIG. 1 may be assembled based on items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the deployment to be defined, the example customer-customizable deployment blueprints 126 may define one or more dependencies between components (e.g., between two or more components) of the deployment to indicate an installation order of the components during deployment. For example, since a load balancer usually cannot be configured until a web application is up and running, the developer 118 may specify a dependency from an Apache service to an application code package. In some examples, due to the user-configurability of the customer-customizable deployment blueprints 126, some dependencies between components are not identifiable until after a customer has provided settings for user-configurable parameters.

The example automation plan generator 122 of the example application director 106 of FIG. 1 generates one or more automation plans 128 based on the customer-customizable deployment blueprint 126 that includes deployment outlines for allocating and configuring resources (e.g., virtual computing resources' cluster size, CPU, memory, networks, etc.) without specific configuration parameter values on what resources to allocate and/or how to configure those resources. That is, the automation plan generator 122 compiles a plurality of instructions (e.g., lines of code) programmed by the developer 118 in the customer-customizable deployment blueprint 126. The compiled plurality of instructions serve as a machine-executable structure to allocate and/or configure resources for a SDDC deployment and/or an application deployment based on user-configurable parameter values provider by a customer to define types of resources, the number of resources, and/or resource configurations for a customer-specific SDDC deployment. In the illustrated example, the automation plan generator 122 generates the automation plans 128 at an IaaS independent of a need of a customer to deploy a product (e.g., a customer's need to deploy a SDDC).

The example automation plan 128 of FIG. 1 provides an IT administrator with a process-oriented view of the customer-customizable deployment blueprint 126 that indicates discrete actions to be performed to deploy the SDDC and/or the application. Different automation plans 128 may be generated from a single customer-customizable deployment blueprint 126 to test prototypes (e.g., new application versions), to scale up and/or scale down deployments, and/or to deploy the SDDC and/or the application to different deployment environments 112 (e.g., testing, staging, production). In some examples, an automation plan 128 is executed by a single host server node in a physical rack of a data center. In some examples, an automation plan 128 is separated and distributed as local automation plans having a series of tasks to be executed by the VMs 114 provisioned from the deployment environment 112. In some such examples, each VM 114 coordinates execution of each task with a centralized deployment module (e.g., the deployment director 124) to ensure that tasks are executed in an order that complies with dependencies specified in the customer-customizable deployment blueprint 126.

In some examples, in response to receiving a customer request to deploy a SDDC and/or a virtual appliance using the automation plan(s) 128, the example deployment director 124 of FIG. 1 executes the automation plan(s) 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of the cloud provider 110 and the deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that is consistent with installation dependencies between VMs 114 (e.g., between two or more VMs 114) according to the automation plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes an example automation deployment manager 140, an example user interface (UI) 142, and an example resource manager 144. The example automation deployment manager 140 is provided to facilitate execution of the automation plans 128. For example, upon execution of an automation plan 128, the automation deployment manager 140 displays user-configurable parameter options as user interface controls (e.g., text fields, radio buttons, dropdown lists, check boxes, etc.) via the UI 142 to customers. In this manner, the automation deployment manager 140 can receive user-provided parameter values for corresponding ones of the user-configurable parameter options to configure an SDDC and/or an application for deployment based on the executed automation plan 128 and the user-provided parameter values. The example automation deployment manager 140 determines dependencies between tasks (e.g., between two or more tasks) in accordance with the executed automation plan 128 and the user-provided parameter values and generates a task execution schedule. The example deployment director 124 of the application director 106 can execute the task execution schedule to deploy the SDDC and/or virtual appliance. The example resource manager 144 is provided to reclaim unused cloud resources. The cloud manager 138 may additionally include other components for managing a cloud environment. In addition, although the example automation deployment manager 140, the example UI 142, and the example resource manager 144 are shown as part of the cloud manager 138, any one or more of the example automation deployment manager 140, the example UI 142, and the example resource manager 144 may instead be part of the application director 106 or another system.

Based on the executed automation plan 128, the example automation deployment manager 140 of the illustrated example manages customer-definable policies (e.g., hardware policies, security policies, network policies, etc.) and definitions for multiple customer-customizable deployments (e.g., an e-commerce provider that includes web servers, application servers, and database servers) based on pre-prepared automation plans 128 and user-configurable parameter options. In this manner, examples disclosed herein enable customers to use automation plans 128 to deploy an SDDC and/or a virtual appliance within 9 hours or in some instances within as few as 3 to 5 hours from the time a customer initiates execution of the automation plan 128. As such, customers need not engage in days-long or weeks-long deployment projects to develop thousands of lines of code and undergo numerous trial and error troubleshooting iterations to successfully deploy an SDDC and/or a virtual appliance, as is done using prior deployment tools. An example deployment of an SDDC and/or virtual appliances in accordance with the teachings of this disclosure is described below in connection with FIG. 2.

The example automation deployment manager 140 of FIG. 1 additionally controls how workflows associated with the customer-customizable deployment blueprints 126 are executed based on customer requirements for a deployment. As used herein, a workflow is a series of actions and decisions to be executed in a virtual computing platform. The example system 100 includes first and second distributed execution manager(s) (DEM(s)) 146*a* and 146*b* to execute workflows. According to the illustrated example, the first DEM 146*a* includes a first set of characteristics and is physically located at a first location 148*a*. The second DEM 146*b* includes a second set of characteristics and is physically located at a second location 148*b*. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example automation deployment manager 140 annotates customer-customizable deployment blueprints 126 with capabilities that can be performed by a DEM that is labeled with the same or similar capabilities.

The resource manager 144 of the illustrated example facilitates recovery of cloud computing resources of the cloud provider 110 that are no longer being actively utilized. Automated reclamation may include identification, verification and/or reclamation of unused, underutilized, etc. resources to improve the efficiency of the running cloud infrastructure.

Figure 2:
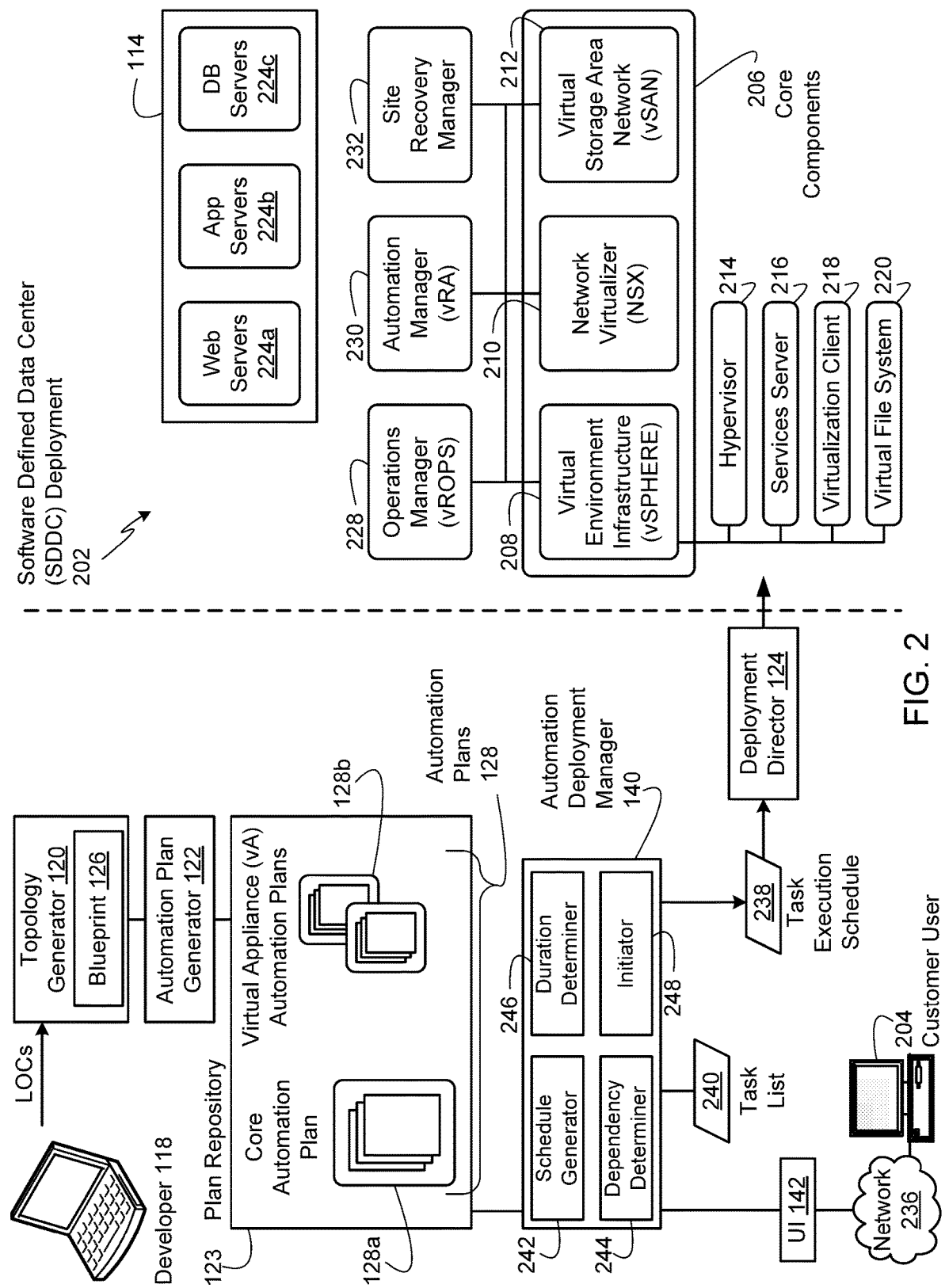
FIG. 2 illustrates an example data flow for generating and executing the automation plans of FIG. 1 to automatically deploy software defined data centers (SDDCs) and/or virtual appliances based on user-configurable parameters specified by customers to customize such deployments.

FIG. 2 illustrates an example data flow for generating and executing the automation plans 128 of FIG. 1 to automatically deploy an example SDDC 202 and/or example virtual appliances based on user-configurable parameters specified by customers to customize such deployments. In the illustrated example, during a design phase, the developer 118 of an IaaS service provider designs or programs one or more customer-customizable deployment blueprints 126 by programming thousands of lines of code (LOCs) to specify a customer-customizable logical topology of a SDDC and/or an application to be deployed. In the illustrated example, the topology generator 120 generates one or more customer-customizable deployment blueprints 126 based on the LOCs. The example automation plan generator 122 generates corresponding automation plans 128 for the one or more customer-customizable deployment blueprints 126 based on a domain specific language (DSL) that is specific for use on a target virtualization platform to be used by a customer to deploy the example SDDC 202 and/or virtual appliances. For example, the LOCs used to program the customer-customizable deployment blueprints 126 can specify variables for use in defining tasks or resources. Such variables can be flagged or tagged in the customer-customizable deployment blueprints 126 to be compiled in the automation plans 128 as user-configurable parameters. Variables in the customer-customizable deployment blueprints 126 that are not to be customer-configurable via the automation plans 128 are not flagged or tagged (or are otherwise indicated) as not to be compiled as user-configurable parameters in the automation plans 128 (e.g., they are to be compiled as fixed values or values to be set automatically by automatic deployment processes during execution of the automation plans 128). Examples of identifying user-configurable parameters and fixed parameters (non-user-configurable parameters) in a programming environment are described below in connection with FIG. 17. In this manner, some variables in the customer-customizable deployment blueprints 126 result in user-configurable parameters in the automation plans 128 that a customer (e.g., the customer user 204 of FIG. 2) can set to customize deployments. Other variables in the customer-customizable deployment blueprints 126 result in static or fixed parameter values in the automation plans 128 that customers cannot customize when running the automation plans 128 to configure deployments. Through such flagging or tagging (or other indications) of task or resource variables in the customer-customizable deployment blueprints 126, the developer 118 can develop customer-customizable deployment blueprints 126 that result in different automation plans 128 having different amounts of flexibility for customizing deployments.

Examples disclosed herein implement the automation plans 128 using a DSL developed to meet the particular needs of end-user customers to deploy, configure, and manage SDDCs and/or virtual appliances in a simpler and more user-friendly way than possible using prior programming languages employed for such SDDC and/or virtual appliance deployment, configuration, and management. For example, the DSL employed by the example automation plan generator 122 uses high-level primitives, programming components, or building blocks which are easier to work with and understand by end customer users than lower-level programming languages (e.g., OpenCL, C, C++, etc.) that require a higher level of technical knowledge, more time for programming, and often comprehensive checks for possible programming errors. In some examples, the automation plan generator 122 can generate tasks in the automation plan(s) 128 using powershell scripts or any other suitable programming language including the Python object-oriented programming language or any scripting language. In this manner, examples disclosed herein use underlying programming to provide user-configurable parameters for tasks and resources in the automation plan(s) 128 so that a customer does not require a highly skilled programmer to configure a deployment. Instead, the customer can define different deployment configurations through a user-friendly interface (e.g., graphical user interface controls, text fields, etc.) by entering user-provided parameter values for corresponding user-configurable parameters of tasks and resources in the automation plan(s) 128. As such, the DSL employed by the example automation plan generator 122 enables customers to define many possible deployment models using the automation plans 128 to suit the particular deployment requirements of those customers without needing to invest in the significant amount of time and in the same level of programming knowledge as is required using lower-level programming languages. The example DSL is based on resources and tasks. Example resources are entities that serve a role during the process of SDDC/virtual appliance deployment. Example resources can include (a) physical entities (e.g., a server host, an infrastructure network, etc.), and (b) logical entities (e.g., internet protocol (IP) addresses, license keys, domain name systems (DNSs), VMs, virtualized network components, etc.). Example tasks employ or manipulate resources. An example task represents a single, well-defined action such as deploying, configuring, or creating a resource. In some instances, an example task consumes one or more resources, which constitute one or more inputs to the task. In some examples, some inputs to a task are optional inputs. In some examples, a task produces one or more resources (e.g., provisions and/or allocates one or more resources from a pool of available resources), which constitute one or more outputs of the task.

When the example automation plan generator 122 generates an automation plan 128, the automation plan 128 includes customizable resource and task definitions that a customer can customize to describe a deployment that serves the particular needs/requirements of that customer. In addition, the example automation plan generator 122 incorporates task metadata in the automation plan 128 to enable (a) lifecycle-based execution of an automation plan 128, and (b) partial execution of the automation plan 128. For example, for lifecycle-based execution, the task metadata is used to determine whether a corresponding task is associated with a particular lifecycle. In this manner, lifecycle-based execution can be used to execute an automation plan 128 only until some lifecycle phase (e.g., only execute the automation plan 128 to deploy a product but not to configure the product once the product is deployed). Partial execution of an automation plan 128 facilitated by the task metadata may be employed during execution to execute only certain parts of the automation plan 128 without executing the entire execution plan 128. In this manner, the task metadata enables a customer to customize a SDDC/virtual appliance deployment by only using some portions of the automation plan 128. For example, an automation plan 128 may deploy an example virtual environmental infrastructure 208 and a network virtualizer 210 described below, but not deploy an automation manager 230 described below.

When the example automation plan generator 122 generates automation plans 128 using the DSL, the automation plan generator 122 stores the automation plans 128 in the example plan repository 123 for subsequent access by a customer user 204 when a need arises for a customer to deploy a product (e.g., a need to deploy an SDDC 202 and/or virtual appliances 224a-c). The customer user 204 may be a customer of the IaaS service provider that developed the automation plans 128 and/or a customer of a third-party developer that develops the automation plans 128 and resells IaaS services of an IaaS service provider. In other examples, the customer user 204 is a customer that obtains the automation plans 128 from a third party that is separate from a IaaS service provider or IaaS reseller.

The plan repository 123 of the illustrated example stores an example core automation plan 128a and a plurality of example virtual appliance (vA) automation plans 128b. The automation plans 128 of the illustrated example are implemented using a plurality of JavaScript Open Notation (JSON) computer language configuration files including compiled instructions generated by the automation plan generator 122 based on the customer-customizable deployment blueprints 126. In other examples, the automation plans 128 may be implemented using any other computer language instead of the JSON computer language. The core automation plan 128a of the illustrated example is provided to define deployment of core components 206 of the example SDDC 202. The core components 206 of the illustrated example include a virtual environment infrastructure 208, an example network virtualizer 210, and an example virtual storage area network 212. The example virtual environment infrastructure 208 is a virtualization platform that includes an example hypervisor 214, an example services server 216, an example virtualization client 218, and example virtual file system 220. In the illustrated example, the virtual environment infrastructure 208 may be implemented using the vSphere virtualization suite developed and sold by VMware, Inc. of Palo Alto, Calif., United States. The example hypervisor 214 may be implemented using the VMware ESXi™ hypervisor developed and sold by VMware, Inc. The example services server 216 may be implemented using the VMware vCenter® Server developed and sold by VMware, Inc. The example virtualization client 218 may be implemented using the VMware vSphere® client developed and sold by VMware, Inc. The example virtual file system 220 may be implemented using the VMware vSphere Virtual Machine File System developed and sold by VMware, Inc. Additionally or alternatively, some or all of the components of the virtual environment infrastructure 208 may be implemented using products from companies other than VMware. In other examples, the virtual environment infrastructure 208 may include additional or different components other than those shown in FIG. 2.

The example network virtualizer 210 is a network virtualization platform that may be used to provide virtual network resources for network computing environments. The example network virtualizer 210 may be implemented using the VMware NSX® network virtualization platform developed and sold by VMware, Inc. The example virtual storage area network 212 is a data storage virtualization platform that may be used to provide virtual data store resources for network computing environments. The example virtual storage area network 212 may be implemented using the VMware® Virtual SAN™ (vSAN) software-defined storage platform developed and sold by VMware, Inc. Additionally or alternatively, the network virtualizer 210 and/or the virtual storage area network 212 may be implemented using products from companies other than VMware, Inc.

In the illustrated example of FIG. 2, the vA automation plans 128b are provided to define deployments of virtual appliances in one or more VMs 114 (or containers 114a of FIG. 1). In the illustrated example, the virtual appliances include one or more example web servers 224a, one or more example app servers 224b, and one or more database (DB) servers 224c. The vA automation plans 128b of the illustrated example prepare the virtual appliances 224a-c for deployment by configuring one or more of the core components 206 and/or by configuring one or more of an example operations manager 228, an example automation manager 230, and an example site recovery manager 232. The example operations manager 228 is provided to automate information technology (IT) operations management of the SDDC 202 to run the virtual appliances 224a-c. The example operations manager 228 may be implemented using the VMware® vRealize® Operations (vROPS) IT Operations Management product developed and sold by VMware, Inc. The example automation manager 228 is provided to automate responsive actions to business needs in real-time to deliver personalized infrastructure, applications, and IT operations when business needs arise within the SDDC 202. The example automation manager 228 may be implemented using the VMware's vRealize® Automation (vRA) product developed and sold by VMware, Inc. The example site recovery manager 232 is provided to implement different levels of availability of the SDDC 202 for different virtual appliances 224a-c. For example, some virtual appliances 224a-c may require higher levels of redundancy or network rerouting capabilities to ensure a higher level of availability for services (e.g., access to the virtual appliances 224a-c and underlying data) even during resource failures. In some examples, other, non-critical virtual appliances 224a-c may only require low to moderate availability. The example site recovery manager 232 may be implemented using the VMware® Site Recovery Manager Disaster Recovery Software developed and sold by VMware, Inc.

To initiate deployment of the SDDC 202 and/or the virtual appliances 224a-c, the customer user 204 accesses the automation plans 128 in the plan repository 123 through the automation deployment manager 140 via a network 236. In response to the customer user 204 requesting one of the automation plans 128, the example automation deployment manager 140 provides the example UI 142 to present a plurality of user-configurable parameters available for the user to configure features of the SDDC 202 and/or the virtual appliances 224a-c. For example, the user interface 142 may display one or more user interface screens shown in FIGS. 5-8 that include user-modifiable UI controls (e.g., text fields, radio buttons, dropdown lists, check boxes, etc.) to enable the customer user 204 to enter user-provided parameter values for corresponding ones of the user-configurable parameter options. The example automation deployment manager 140 is provided with an example schedule generator 242 that generates a task list 240 of tasks in the automation plan(s) 128 to deploy the SDDC 202 and/or the virtual appliance(s) 224a-c. The task list 240 of the illustrated example is an execution graph or timeline that lays out dependencies between tasks. For example, the task list 240 arranges tasks so that tasks requiring output resources from other tasks are arranged in a correct order after a time that those required resources would be available. The example schedule generator 242 uses the user-provided parameter values received via the user interface 142 in combination with tasks from the task list 240 to generate an example task execution schedule 238 of tasks needed to deploy the SDDC 202 and/or the virtual appliance(s) 224a-c. The task execution schedule 238 of the illustrated example is an ordered list of tasks that takes into account inter-dependencies between tasks such that one task is ordered or arranged to start after a required resource has been provided as an output of a previous task or by another process or user independent of the task execution schedule. In some examples, the task execution schedule 238 is a version of the task list 240 that defines a task execution order in a finalized form ready for execution after determining all dependencies and after removing tasks deemed unnecessary (e.g., due to such tasks being unnecessary to deploy the SDDC 202 and/or the virtual appliance(s) 224a-c and/or due to such tasks being unnecessary based on resources to be output by such tasks being provided for the deployment through some other means external to the tasks). The example schedule generator 242 can arrange and/or rearrange execution order of tasks in the automation plan(s) 128 by changing dependencies referred to by reference inside files (e.g., JSON configuration files) of the automation plan(s) 128.

In the illustrated example, the automation deployment manager 140 is provided with an example dependency determiner 244 to determine dependencies between tasks in the task list 240 to schedule the tasks for executing in a time-efficient manner. The example dependency determiner 244 operates in cooperation with the example schedule generator 242 to determine inter-task dependencies, parallel execution opportunities, and correct task execution order to generate a time-efficient task execution schedule 238. For example, based on the dependencies between tasks, the dependency determiner 244 can decrease or eliminate instances in which task execution is halted/stalled or slowed to wait on one or more other tasks that need to finish. For example, some tasks may be configured to allocate resources that are required by subsequent tasks. That is a resource output of one task may serve as an input for another one or more tasks further down the deployment workflow.

In examples disclosed herein, each task is provided with task metadata to associate that task with a corresponding lifecycle phase (e.g., a deployment phase, a configuration phase, etc.) of a specific software product (e.g., the virtual environment infrastructure 208, the network virtualizer 201, the automation manager 230, etc.). To schedule a time-efficient execution of tasks with inter-dependencies, the example dependency determiner 244 is configured to use task metadata in the automation plan(s) 128 identify task-completion durations required for completing tasks and resource-allocation durations required to allocate resources. In this manner, the example dependency determiner 244 can use such task-completion durations and/or resource-allocation durations to generate the task execution schedule 238 so that the SDDC 202 and/or virtual appliance(s) 224a-c can be deployed by the customer user 204 in significantly less time than is possible with prior deployment techniques. For example, using examples disclosed herein, the SDDC 202 and/or virtual appliance(s) 224a-c can be deployed within nine hours or in some instances within as few as three to five hours from the time that the customer user 204 initiates execution of the automation plan 128.

The schedule generator 242 and the dependency determiner 244 of the illustrated example provide the task execution schedule 238 with task execution flexibility during a deployment process based on (a) automatic task execution and (b) conditional task execution. For example, automatic task execution involves in-advance scheduling the execution of a task based on the presence of pre-requisite resources required by that task and/or real-time triggering of the execution of a task based on the presence of pre-requisite resources required by that task. For in-advance scheduling, a task may be fixedly scheduled to execute after the scheduled creation of a resource (e.g., the estimated time during a deployment process at which the resource is scheduled to be provisioned and/or allocated for use). For real-time triggering, a task may be flexibly scheduled in the task execution schedule 238 to trigger upon detecting the presence of a resource(s) (e.g., the resource(s) is/are provisioned and/or allocated) required by that task. Conditional task execution allows omission of a task from the task execution schedule 238 when a resulting resource to be produced by the task is already provided external from the deployment process. Such omission of the task can be configured in advance during creation of the task execution schedule 238 when the schedule generator 242 and/or the example dependency determiner 244 determine(s) that the resource to be produced by that task is already provided externally from the deployment execution. Additionally or alternatively, the conditional task execution can be used to determine during execution of the task execution schedule 238 to not execute a scheduled task of the task execution schedule 238 based on detecting that the resource to be produced by that task is already provided externally from the deployment execution.

The example automation deployment manager 140 is provided with a duration determiner 246 to determine a total elapsed duration that is indicative of an amount of time that has elapsed since the start of execution of the task execution schedule 238. In some examples, the UI 142 can display such total elapsed duration as a total elapsed duration 906 of FIG. 9.

The example automation deployment manager 140 is provided with an example initiator 248 to initiate deployment of the SDDC 202 and/or the virtual appliance(s) 224a-c based on the task execution schedule 238. For example, the initiator 248 may receive a user-input "start deployment" command via the UI 142. In turn, the example initiator 248 may send the example deployment director 124 a request to start the automated deployment process based on the task execution schedule 238 to deploy the SDDC 202 and/or the virtual appliance(s) 224a-c. In the illustrated example, the deployment director 124 coordinates execution of the tasks in a server node of a data center (e.g., a host server in a physical rack of a data center) in accordance with the task execution schedule 238 to deploy the SDDC 202 and/or virtual appliance(s) 224a-c via the server node. In other examples, more than one server node may be used to execute the task execution schedule 238.

While an example manner of implementing the example application director 106 and the example cloud manager 138 of FIG. 1 is illustrated in FIG. 2, one or more of the elements, processes and/or devices illustrated in FIGS. 1 and 2 may be combined, divided, re-arranged, omitted, eliminated and/or implemented in any other way. Further, the example topology generator 120, the example automation plan generator 122, the example plan repository 123, the example deployment director 124, the example automation deployment manager 140, the example UI 142, the example resource manager 144, the example schedule generator 242, the example dependency determiner 244, the example duration determiner 246, the example initiator 248, and/or, more generally, the example application director 106 and/or the example cloud manager 138 of FIG. 1 may be implemented by hardware, software, firmware and/or any combination of hardware, software and/or firmware. Thus, for example, any of the example topology generator 120, the example automation plan generator 122, the example plan repository 123, the example deployment director 124, the example automation deployment manager 140, the example UI 142, the example resource manager 144, the example schedule generator 242, the example dependency determiner 244, the example duration determiner 246, the example initiator 248, and/or, more generally, the example application director 106 and/or the example cloud manager 138 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example topology generator 120, the example automation plan generator 122, the example plan repository 123, the example deployment director 124, the example automation deployment manager 140, the example UI 142, the example resource manager 144, the example schedule generator 242, the example dependency determiner 244, the example duration determiner 246, and/or the example initiator 248 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106 and/or the example cloud manager 138 of FIG. 1 may include one or more elements, processes and/or devices in addition to, or instead of, those illustrated in FIGS. 1 and 2, and/or may include more than one of any or all of the illustrated elements, processes and devices.

Figure 3:
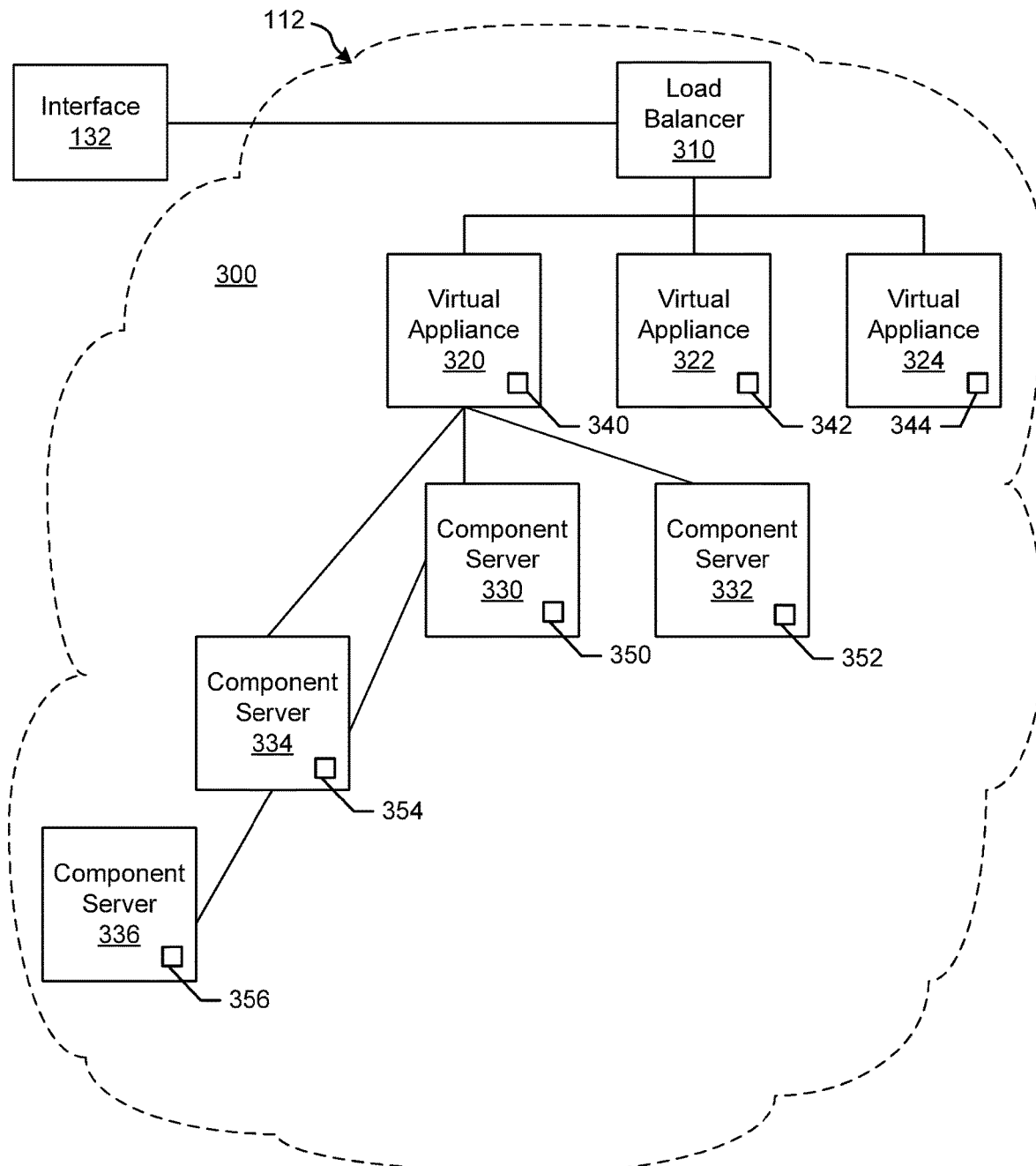
FIG. 3 illustrates an example installation of deployed virtual machines and associated servers acting as hosts for deployment of component servers for a customer.

FIG. 3 illustrates an example installation of deployed appliances or virtual appliances (vAs) (e.g., the virtual appliances 224a-c of FIG. 2 running on one or more VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™ Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 224a with Web components, App server 224b with application components, DB server 224c with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
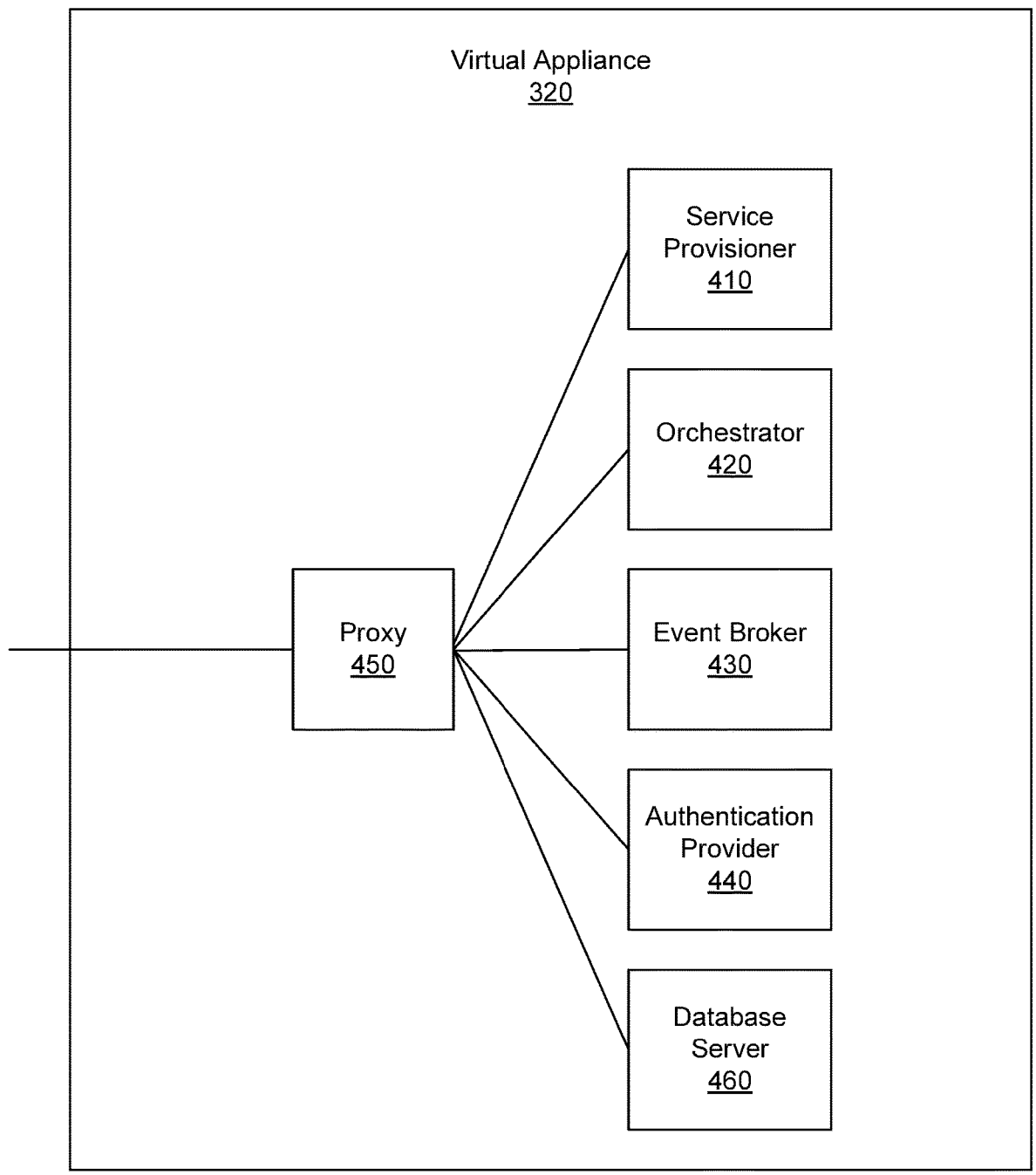
FIG. 4 illustrates an example implementation of a virtual appliance.

FIG. 4 illustrates an example implementation of the vA 320 of FIG. 3. In the example of FIG. 4, the vA 320 includes a service provisioner 410, an orchestrator 420, an event broker 430, an authentication provider 440, an internal reverse proxy 450, and a database 460. The components 410, 420, 430, 440, 450, 460 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

Figure 5:
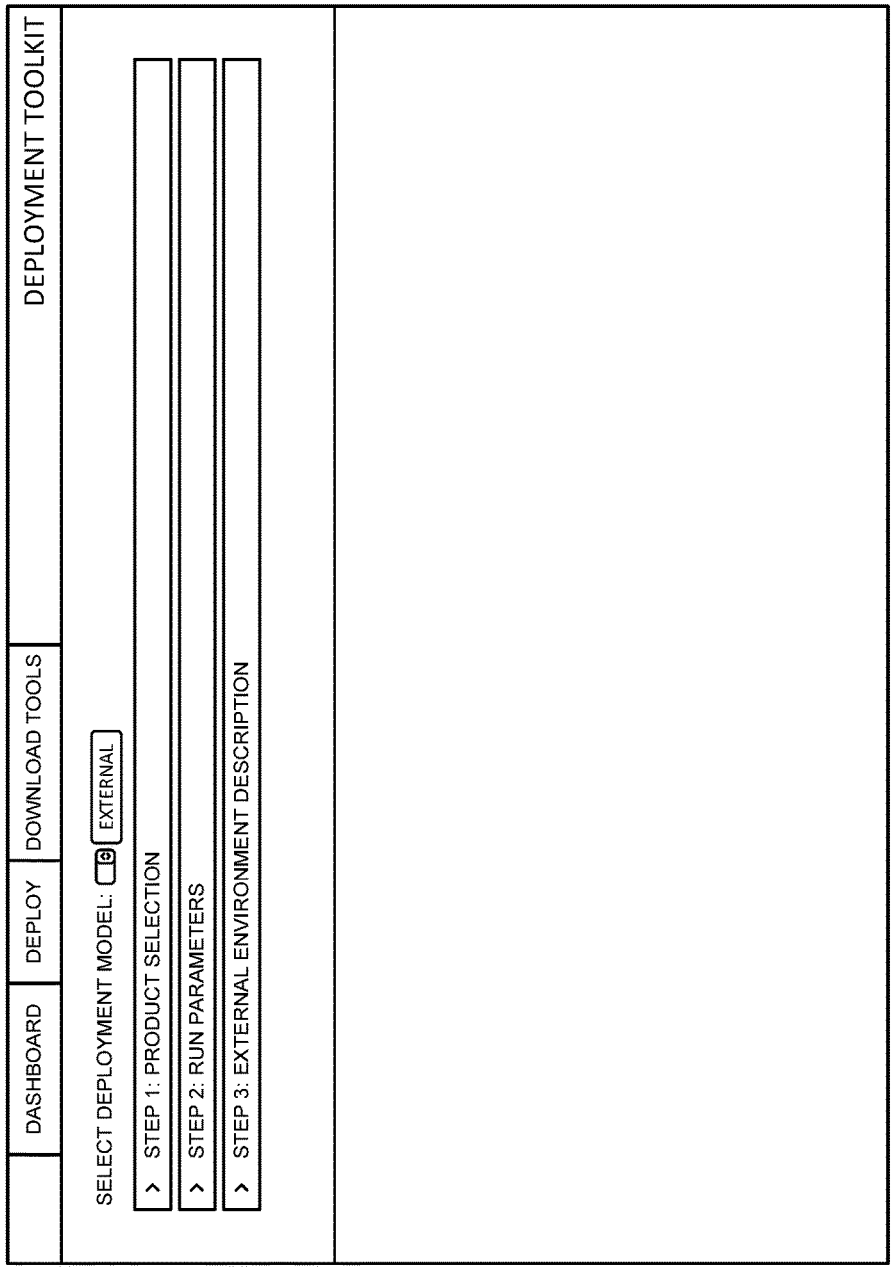
FIG. 5 illustrates an example main deployment automation configuration user interface that may be displayed to a customer to specify user-configurable parameter settings for customizing deployment of an SDDC and/or a virtual appliance.
Figure 6:
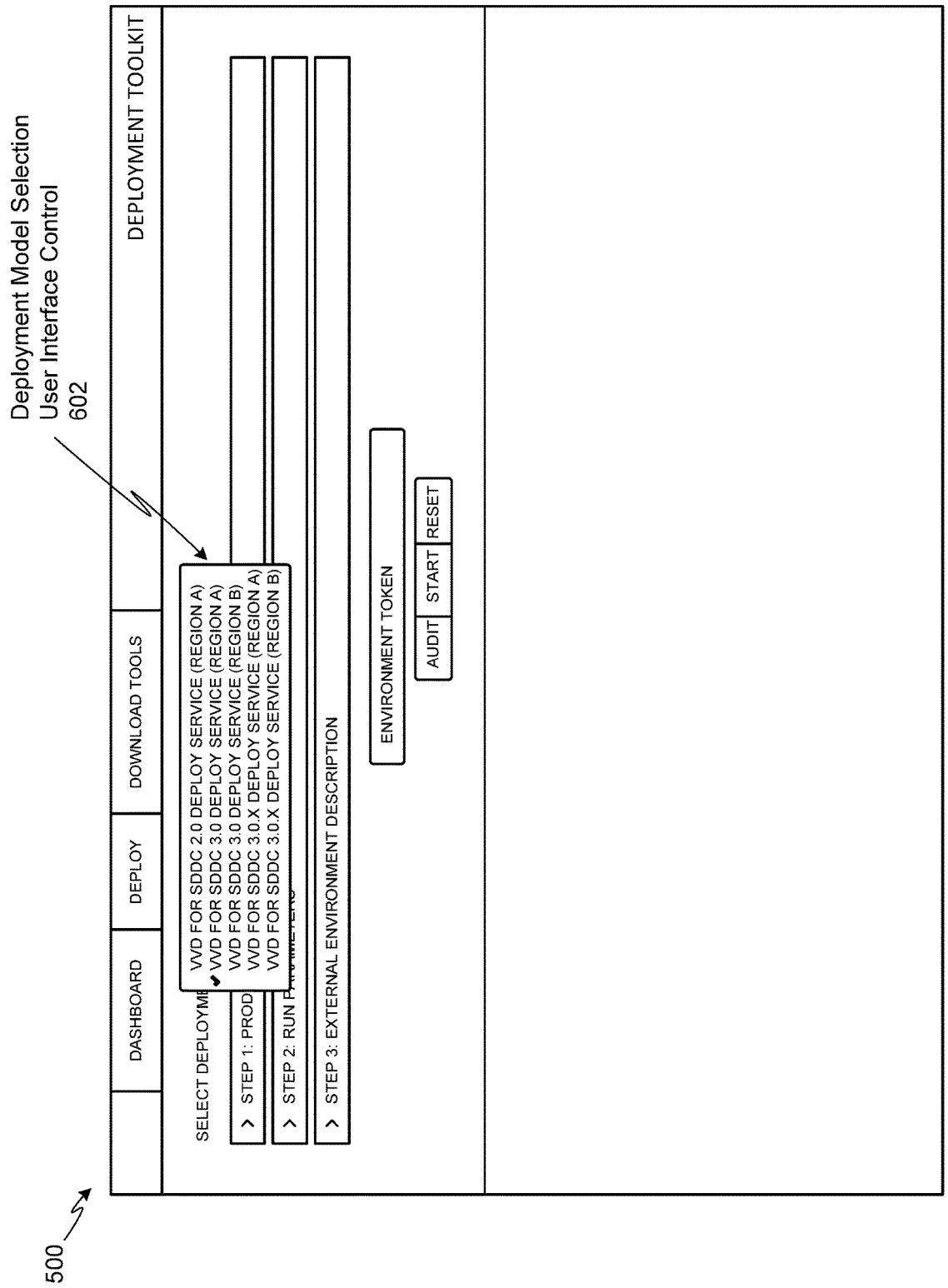
FIG. 6 illustrates an example deployment model selection user interface for selecting a model for deploying an SDDC.

FIG. 5 illustrates an example main deployment automation configuration user interface 500 that may be displayed by the example automation deployment manager 140 (FIGS. 1 and 2) via the example UI 142 (FIGS. 1 and 2) for access by the customer user 204 (FIG. 2). The main deployment automation configuration user interface 500 of the illustrated example is accessible by the customer user 204 to specify user-configurable parameters settings for customizing deployment of the SDDC 202 and/or the virtual appliance(s) 224a-c of FIG. 2. FIG. 6 illustrates an example deployment model selection user interface control 602 (e.g., a dropdown list control) that the example automation deployment manager 140 displays via the UI 142 in the example deployment automation configuration user interface 500. In the illustrated example, the customer user 204 may use the deployment model selection user interface control 602 to select a model for deploying the SDDC 202.

Figure 7:
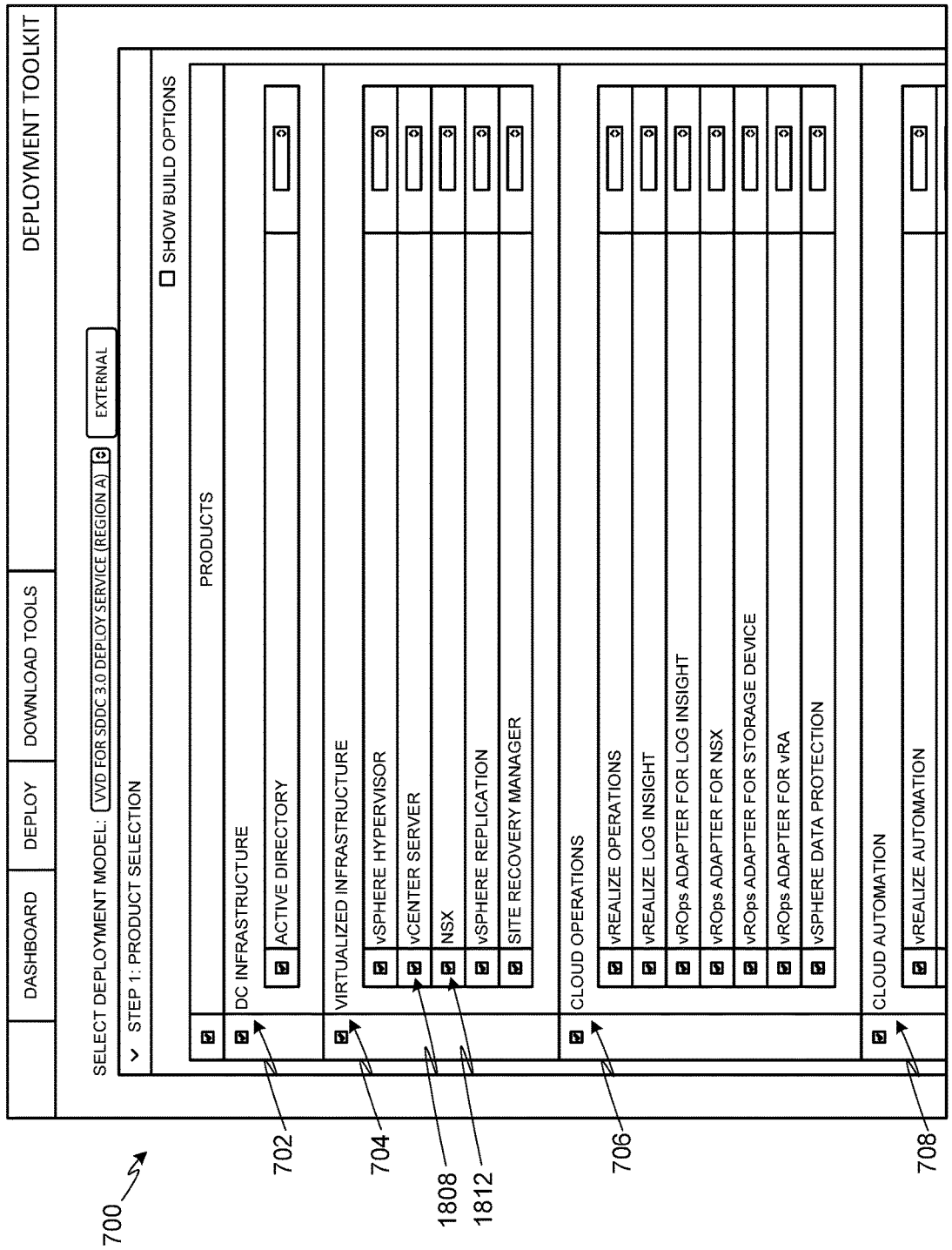
FIG. 7 illustrates an example product selection user interface for specifying user-configurable parameter settings for different products to be included in the SDDC.

FIG. 7 illustrates an example product selection user interface 700 that may be displayed by the example automation deployment manager 140 via the example UI 142 for access by the customer user 204. The product selection user interface 700 of the illustrated example enables the customer user 204 to specify user-configurable parameter settings for different products to be included in the SDDC 202. Example products shown in FIG. 7 are in the product areas of data center (DC) infrastructure 702, virtualized infrastructure 704, cloud operations 706, and cloud automation 708. In other examples, additional or alternative product areas and/or specific products may be provided for selection.

Figure 8:
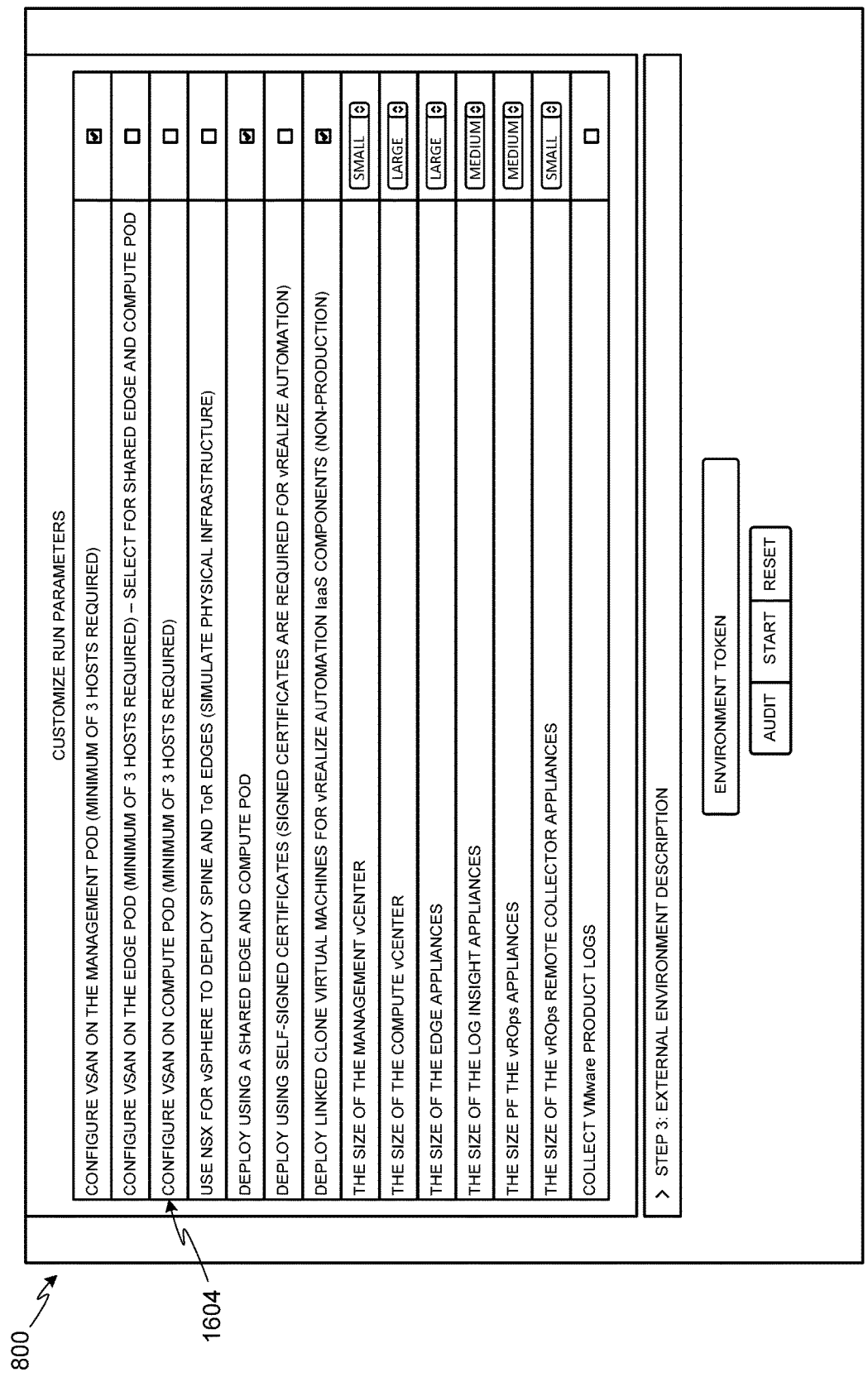
FIG. 8 illustrates an example run parameters configuration user interface for specifying user-configurable parameter settings for different run parameters for use to run different processes in the SDDC.

FIG. 8 illustrates an example run parameters configuration user interface 800 that may be displayed by the example automation deployment manager 140 via the example UI 142 for access by the customer user 204. The run parameters configuration user interface 800 of the illustrated example enables the customer user 204 to specify user-configurable parameter settings for different run parameters that different components of the SDDC 202 use during runtime when the SDDC 202 is deployed. For example, the run parameters configurable via the run parameters configuration user interface 800 may be used by one or more of the virtual environment infrastructure 208, the network virtualizer 210, the virtual storage area network 212, the operations manager 228, the automation manager 230, and/or the site recovery manager 232 of FIG. 2 to run the SDDC 202.

Figure 9:
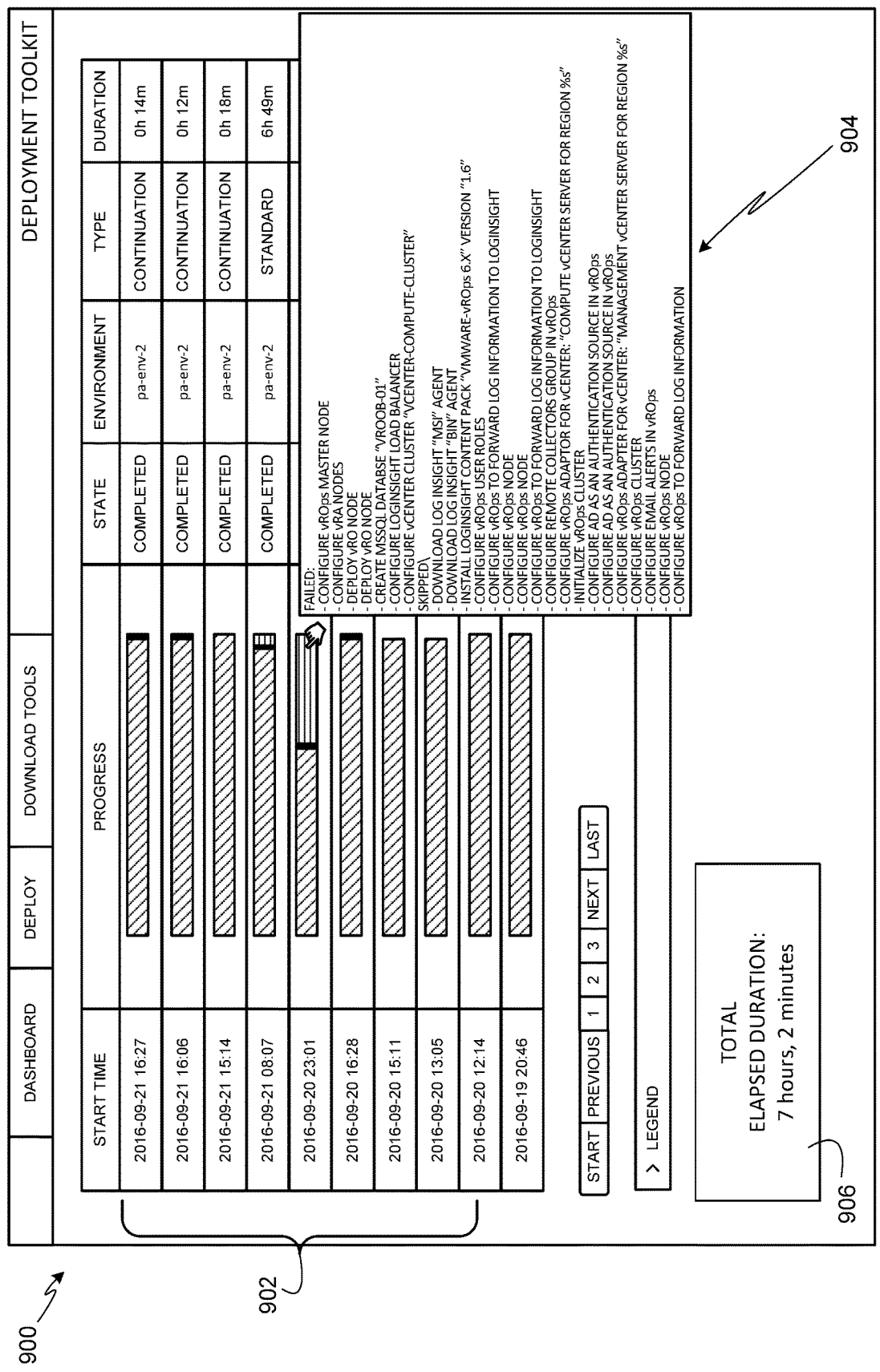
FIG. 9 illustrates an example automated deployment status user interface to show a progress status of an automated deployment of the SDDC.

FIG. 9 illustrates an example automated deployment status user interface 900 that may be displayed by the example automation deployment manager 140 via the example UI 142 for access by the customer user 204. The automated deployment status user interface 900 of the illustrated example is used by the automation deployment manager 140 to display progress statuses 902 of different tasks of the task execution schedule 238 that are executed to run the automated deployment of the SDDC 202. As shown in FIG. 9, when a cursor is placed over a progress bar, the example UI 142 displays a status overlay window 904 listing status of different operations of a corresponding task. In the illustrated example, the status overlay window 904 shows operations that have failed and operations that were skipped.

In the illustrated example, the automated deployment status user interface 900 displays an example total elapsed duration 906. The example total elapsed duration 906 is determined by the duration determiner 246 (FIG. 2) as the total amount of time that has elapsed since the time the initiator 248 (FIG. 2) started execution of the task execution schedule 238 (FIG. 2).

FIG. 10 illustrates an example troubleshooting user interface 1000 that may be used to diagnose failures during the automated deployment of the SDDC 202. In the illustrated example, the customer user 204 can click on a status bar to view detailed information concerning a failure of a task. Such information can include an out-of-storage error, a missing resource error, etc. In some instances, the customer user 204 can fix an error or errors, and click on a continue button to continue execution of the task.

Figure 11:
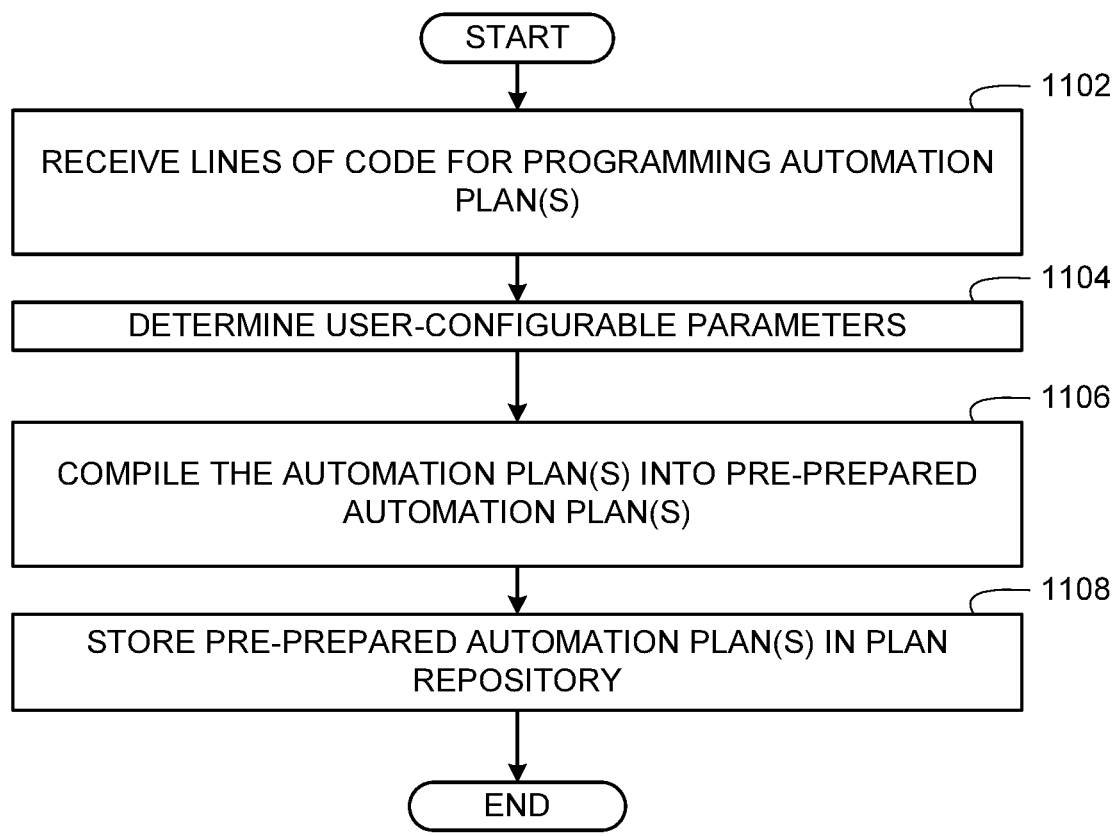
FIG. 11 is a flow diagram representative of example computer readable instructions that may be executed to implement the example automation plan generator of FIGS. 1 and 2.
Figure 12A:
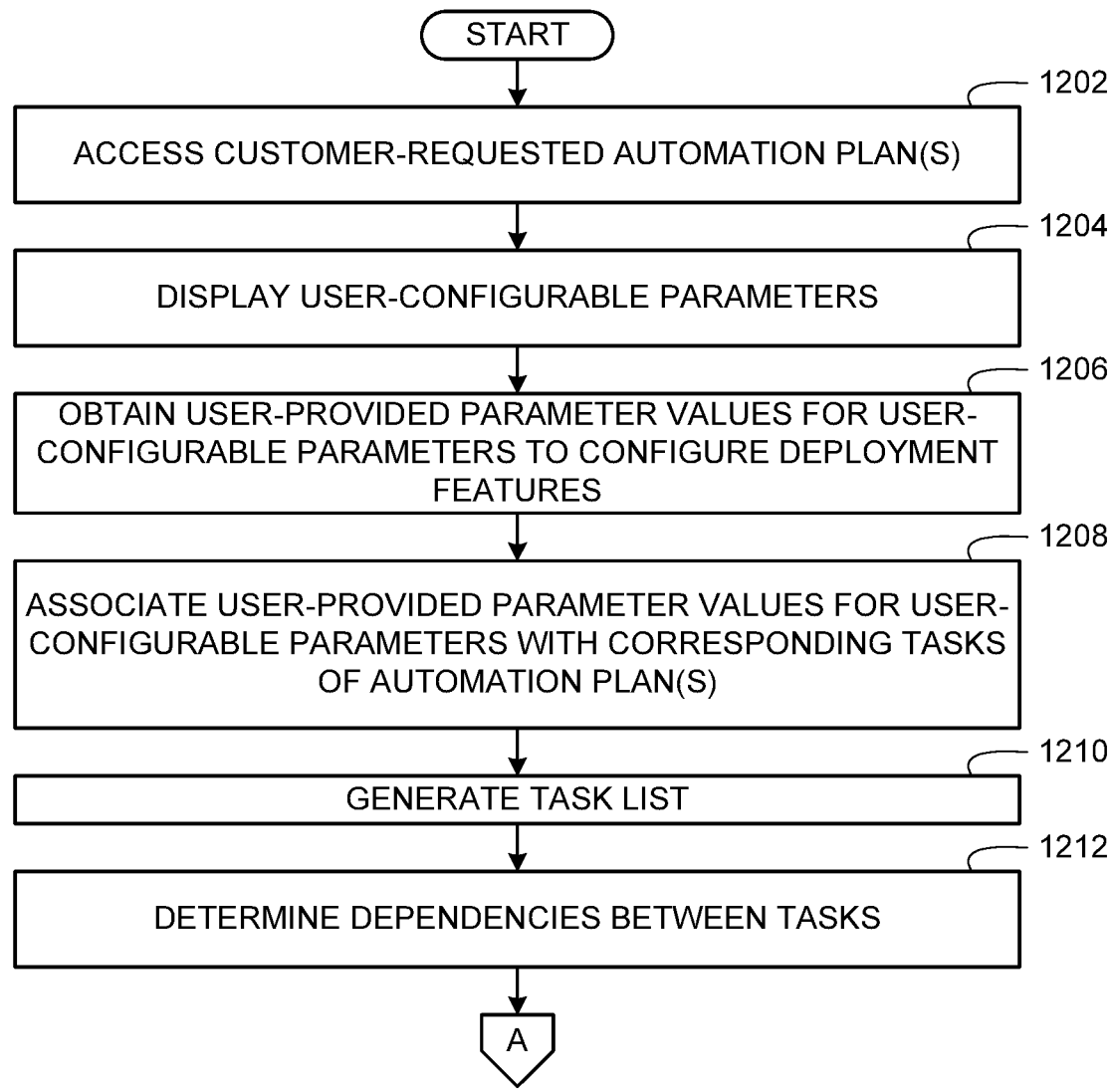
FIGS. 12A and 12B illustrate a flow diagram representative of example computer readable instructions that may be executed to implement the example deployment manager of FIGS. 1 and 2.
Figure 12B:
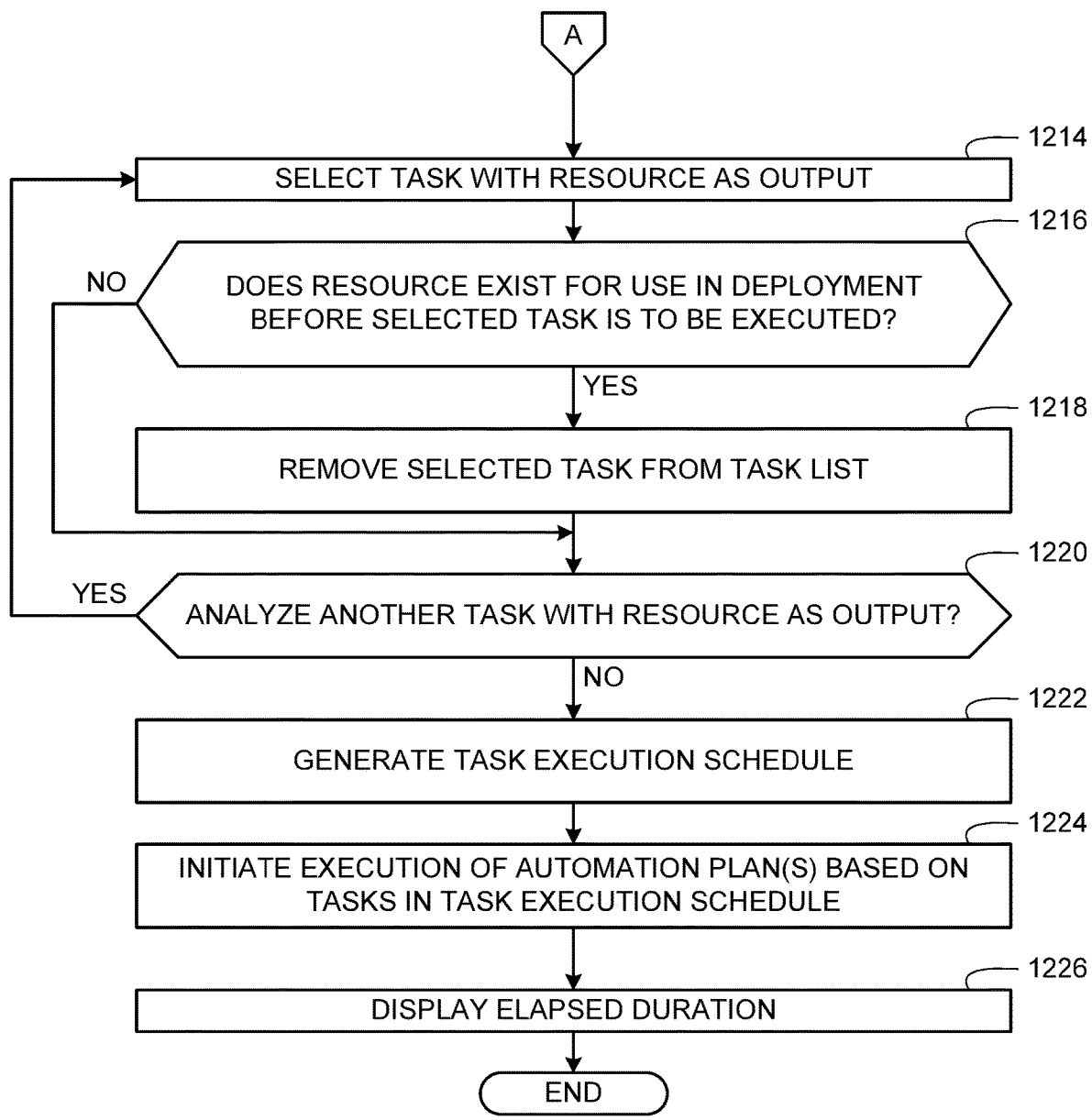

Flowcharts representative of example machine readable instructions that may be executed to implement the example application director 106 and/or the example cloud manager 138 or portions thereof of FIG. 1 are shown in FIGS. 11, 12A, and 12B. In this example, the machine readable instructions include programs for execution by a processor such as the processor 1312 shown in the example processor platform 1300 discussed below in connection with FIG. 13.

The programs may be embodied in software stored on a tangible computer readable storage medium such as a CD-ROM, a floppy disk, a hard drive, a digital versatile disk (DVD), a Blu-ray disk, or a memory associated with the processor 1312, but the entirety of the programs and/or parts thereof could alternatively be executed by a device other than the processor 1312 and/or embodied in firmware or dedicated hardware. Further, although the example programs are described with reference to the flowcharts illustrated in FIGS. 11, 12A, and 12B, many other methods of implementing the example application director 106 and/or the example cloud manager 138 may alternatively be used. For example, the order of execution of the blocks may be changed, and/or some of the blocks described may be changed, eliminated, or combined.

As mentioned above, the example processes of FIGS. 11, 12A, and 12B may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 11, 12A, and 12B may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning now to FIG. 11, the depicted flowchart can be used during an automation plan preparation phase during which the application director 106 (FIG. 1) pre-prepares automation plans 128 for subsequent use by customers (e.g., the customer user 204 of FIG. 2) to implement automated deployments of SDDCs and/or virtual appliances. The program of FIG. 11 begins at block 1100 at which the example topology generator 120 (FIGS. 1 and 2) receives LOCs for programming one or more automation plan(s) 128 (FIGS. 1 and 2). For example, the topology generator 120 can receive the LOCs provided by the developer (FIGS. 1 and 2) via one or more customer-customizable deployment blueprints 126. The automation plan generator 122 (FIGS. 1 and 2) determines user-configurable parameters (block 1104). For example, the LOCs received at block 1102 include variables that are flagged, tagged, or otherwise identified as needing to be compiled in corresponding automation plan(s) 128 as user-configurable parameters that customers (e.g., the customer user 204 of FIG. 2) can set when running the automation plan(s) 128 to customize deployments. Such user-configurable parameters are not set to fixed values during the automation plan preparation phase of FIG. 11. Instead, the automation plan generator 122 leaves the user-configurable parameters in the automation plan(s) 128 as configurable by a user during an automation plan execution phase described below in connection with FIGS. 12A and 12B.

The example automation plan generator 122 compiles the automation plan(s) 128 into pre-prepared automation plan(s) 128 (block 1106). The example automation plan generator 122 stores the automation plan(s) 128 in the plan repository 123 (block 1108). In this manner, the automation plan(s) 128 can subsequently be accessed and used by customers such as the customer user 204 (FIG. 2) for use to customize and automatically deploy the SDDC 202 and/or the virtual appliances 224*a-c* of FIG. 2. The example process of FIG. 11 then ends.

Turning now to FIGS. 12A and 12B, the depicted flowchart can be used during an example automation plan execution phase during which the application director 106 and the cloud manager 138 (FIG. 1) use the automation plan(s) 128 accessed by a customer (e.g., the customer user 204 of FIG. 2) to customize and automate deployment of the SDDC 202 and/or the virtual appliances 224*a-c* of FIG. 2 in accordance with customer configurations of the automation plan(s) 128. The program begins at block 1202 of FIG. 12A at which the automation deployment manager 140 (FIGS. 1 and 2) accesses one or more automation plan(s) 128. For example, the customer user 204 requests to access one or more pre-prepared automation plans 128 from the plan repository 123 (FIGS. 1 and 2) such as the core automation plan 128*a* (e.g., to configure the core components 206) and/or one or more virtual appliance plans 128*b* of FIG. 2 to customize an automatic deployment of the SDDC 202 and/or one or more of the virtual appliances 224*a-c*. The example UI 142 displays user-configurable parameters from the automation plan(s) 128 (block 1204). For example, the UI 142 displays the user-configurable parameters using the user interfaces 500 (FIGS. 5 and 6), 700 (FIG. 7), 800 (FIG. 8) to enable the customer user 204 to specify user-provided parameter values for those user-configurable parameters to customize the deployment(s) of the SDDC 202 and/or one or more of the virtual appliances 224*a-c* based on the customer requirements of the customer user 204.

The example schedule generator 242 (FIG. 2) obtains user-provided parameter values for user-configurable parameters to configure deployment features (block 1206). For example, the schedule generator 242 can obtain the user-provided parameter values provided by the customer user 204 for corresponding user-configurable parameters displayed in the user interfaces 500, 700, 800 to configure features of the SDDC 202 and/or one or more of the virtual appliances 224*a-c*. In the illustrated example, the schedule generator 242 obtains the user-provided parameter values via graphical user interface controls or text fields of the UI 142 (e.g., via one or more of the user interfaces of FIGS. 5-10) without needing to receive extensive programming lines of code from the customer user 204 after accessing the pre-prepared automation plan. The example schedule generator 242 associates the user-provided parameter values for the user-configurable parameters with corresponding tasks to be executed as part of the automation plan(s) 128 (block 1208). The example schedule generator 242 generates the task list 240 (block 1210). In the illustrated example, the schedule generator 242 generates the task list 240 based on the pre-prepared automation plan(s) 128 and the user-provided parameter values without receiving any LOC via any user input from the customer user 204. For example, the schedule generator 242 can use the user-provided parameter values to determine what tasks from the pre-prepared automation plan(s) 128 should be in the task list 240 and/or the order in which the tasks should appear in the task list 240. The example dependency determiner 244 (FIG. 2) determines dependencies between tasks in the task list 240 (block 1212).

Referring now to FIG. 12B, the example dependency determiner 244 selects a task that has a resource as an output (block 1214). For example, the dependency determiner 244 selects a task from the task list 240 that is to be executed to allocate or provision a resource for use in the SDDC 202 and/or the virtual appliance(s) 224a-c. The example dependency determiner 244 determines whether the resource exists for use in the deployment before the task is to be executed (block 1216). For example, before or during execution of the automation plan(s) 128, the resource may be allocated or provisioned external to the automation plan(s) 128 by another process and/or by a user (e.g., the customer user 204) for use by the automation plan(s) 128. In this manner, the automation plan(s) 128 need not allocate or provision the resource. If the example dependency determiner 244 determines at block 1216 that the resource does pre-exist, the schedule generator 242 removes the selected task from the task list 240 (block 1218). After removal of the selected task at block 1218, or if the example dependency determiner 244 determines at block 1216 that the resource does not pre-exist, the dependency determiner 244 determines whether to analyze another task having a resource as an output (block 1220). If the example dependency determiner 244 determines at block 1220 that there is another task with a resource as an output that needs to be analyzed, control returns to block 1214 to select and analyze the next task. Otherwise, control advances to block 1222.

At block 1222, the example schedule generator 242 generates the task execution schedule 238. In some examples, the schedule generator 242 generates the task execution schedule 238 as a version of the task list 240 in a finalized form ready for execution after determining all dependencies and after removing tasks deemed unnecessary. The example initiator 248 (FIG. 2) initiates the execution of the automation plan(s) 128 based on the tasks in the task execution schedule 238 (block 1224). In this manner, the deployment director 124 (FIGS. 1 and 2) coordinates execution of the scheduled tasks by a server node to automatically deploy the SDDC 202 and/or the virtual appliance(s) 224a-c. The example UI 142 then displays the total elapsed duration 906 (block 1226). For example, the UI 142 obtains the total elapsed duration 906 from the duration determiner 246 (FIG. 2) and displays the total elapsed duration 906 as shown in FIG. 9. The example process of FIGS. 12A and 12B then ends.

Figure 13:
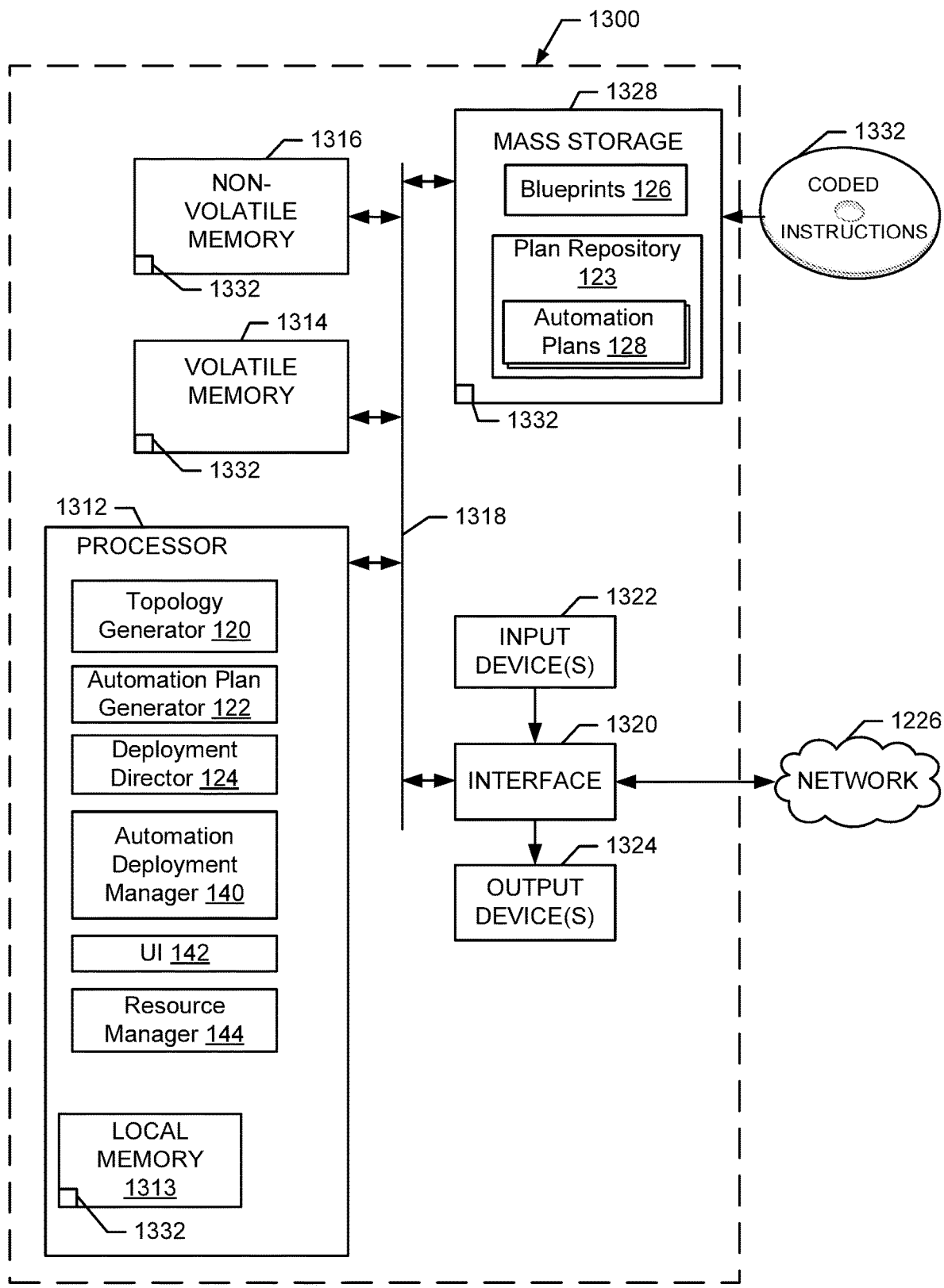
FIG. 13 is a block diagram of an example processing platform capable of executing the example machine-readable instructions of FIGS. 11, 12A, and 12B in accordance with the teachings of this disclosure.

FIG. 13 is a block diagram of an example processor platform 1300 capable of executing the instructions of FIGS. 11, 12A, and 12B to implement the example systems, operation, and management of FIGS. 1-10. The processor platform 1300 of the illustrated example includes a processor 1300. The processor 1300 of the illustrated example is hardware. For example, the processor 1300 can be implemented by one or more integrated circuits, logic circuits, microprocessors or controllers from any desired family or manufacturer.

The processor 1300 of the illustrated example includes a local memory 1300 (e.g., a cache), and executes instructions to implement the example application director 106 and/or the example cloud manager 138 of FIG. 1 or portions thereof, such as the topology generator 120, the automation plan generator 122, the deployment director 124, the automation deployment manager 140, the UI 142, and/or the resource manager 144. The processor 1300 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include flash devices, floppy disk drives, hard drive disks, optical compact disk (CD) drives, optical Blu-ray disk drives, RAID systems, and optical digital versatile disk (DVD) drives. The mass storage device(s) 1328 of the illustrated example store(s) the plan repository 123, the customer-customizable deployment blueprints 126, and/or the automation plans 128 of FIG. 1.

Coded instructions 1332 representative of the example machine readable instructions of FIGS. 11, 12A, and 12B may be stored in the mass storage device 1328, in the volatile memory 1314, in the non-volatile memory 1316, and/or on a removable tangible computer readable storage medium such as a CD or DVD.

In some examples, the processor 1312 can be used to implement the SDDC 202 and the virtual appliances 224a-c of FIG. 2 and/or the virtual appliance 320 (and vAs 322-324) and the component server 330 (and servers 332-336) of FIG. 3 and/or their components including the service provisioner 410, the orchestrator 420, the event broker 430, the authentication provider 440, the proxy 450, the database server 460, etc. In some examples, as disclosed herein, the hardware of processor 1312 is virtualized using virtualization such as VMs and/or containers. In the example of FIG. 13, the virtual appliance 320 and/or the component server 330 can be implemented by one or more VMs or containers, so as to virtualize the hardware of processor 1312.

Figure 14:
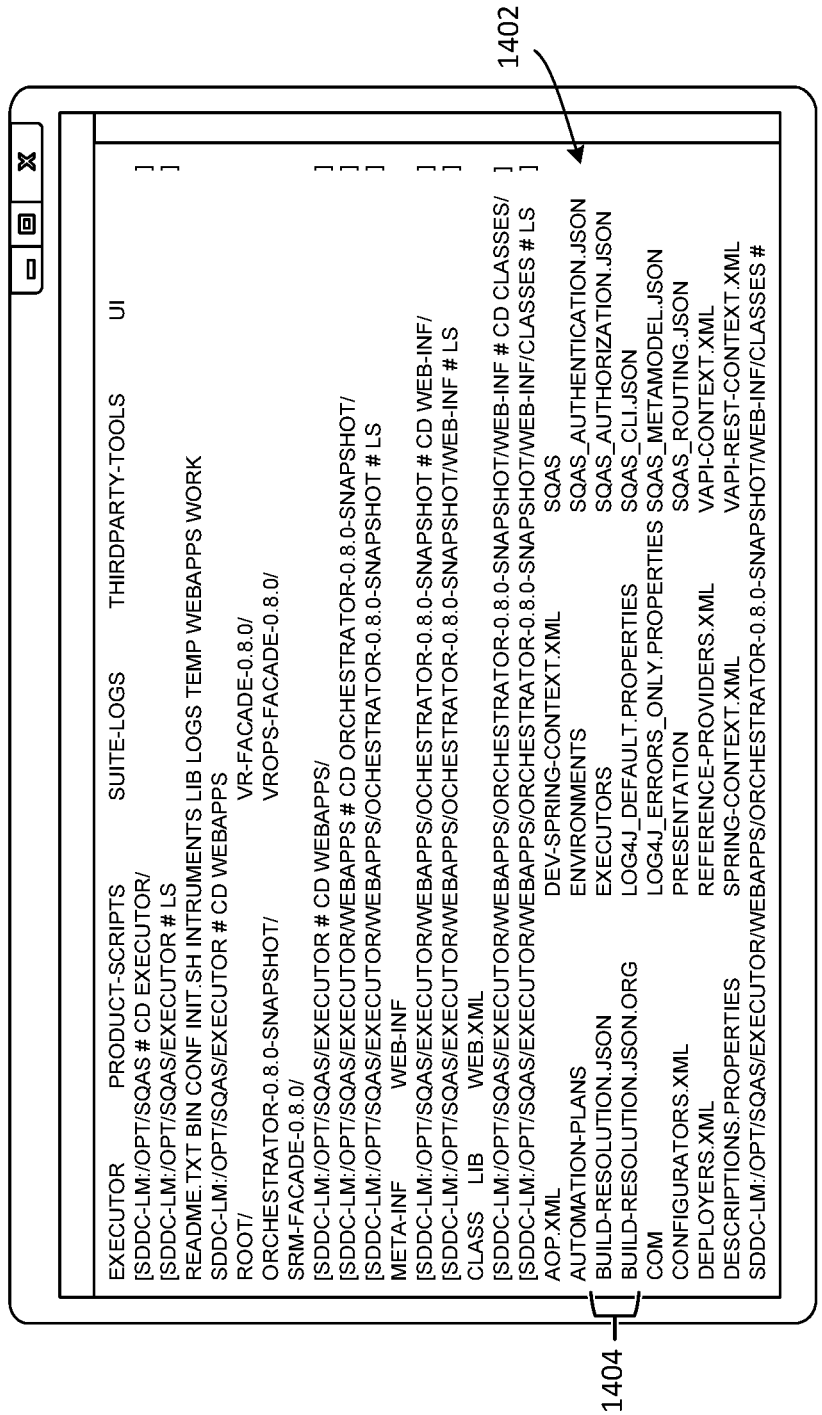
FIG. 14 shows automation plan configuration files that include build resolution configuration files for use during a quality assurance phase to test a corresponding automation plan for component interoperability issues that could arise during a deployment.

FIG. 14 shows an example listing of automation plan configuration files 1402 that include example build resolution configuration files 1404 for use during a quality assurance phase to test a corresponding automation plan 128 (FIGS. 1 and 2) for component interoperability issues that could arise during a deployment. The build resolution configuration files 1404 (e.g., "build-resolution.json" and "build-resolution.json.org") indicate the most recent build numbers or build versions of the product components (e.g., the virtual environment infrastructure 208, the network virtualizer 210, the virtual storage area network 212, the operations manager 228, the automation manager 230, the site recovery manager 232 of FIG. 2) that are used by an automation plan 128 for deployments. A quality assurance (QA) team can use the example build resolution configuration files 1404 to verify that a most recent build of a corresponding automation plan includes the most recent builds of product components to deploy the SDDC 202 and/or virtual appliances 224a-c of FIG. 2. For example, the build resolution configuration files 1404 can be used to check interoperability issues between the product components. Example interoperability tests check for bugs in different products to ensure that automation plans 128 do not cause interoperability issues during use in deployment. To perform the interoperability tests during an example QA phase, a QA team builds its own deployment to apply their QA framework that runs the interoperability tests on the deployment resulting from an automation plan 128 under test. In some examples, the QA framework can trigger third-party tests for use as part of the interoperability tests.

Figure 15:
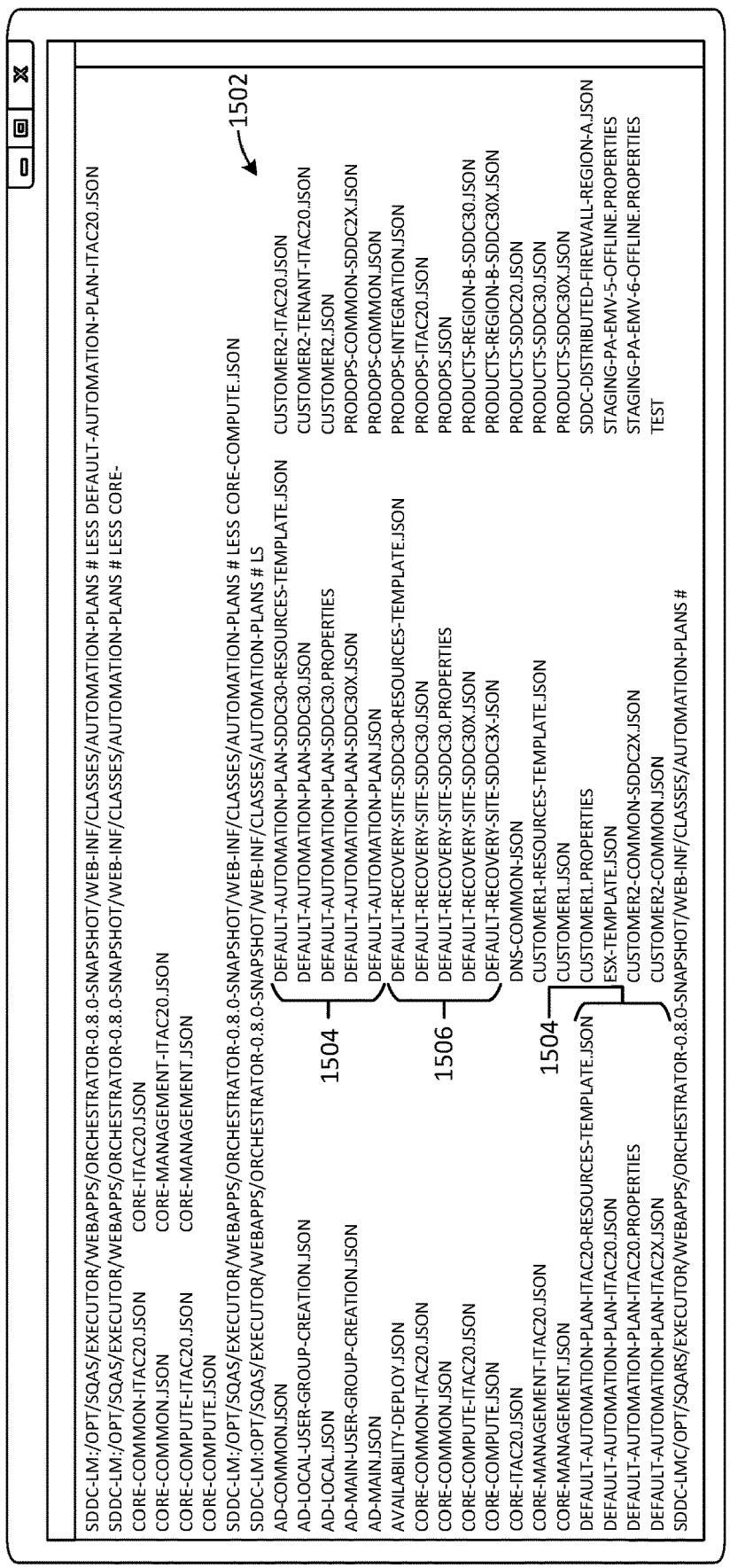
FIG. 15 shows automation plan configuration files for implementing different deployments that are customizable by a customer.

FIG. 15 shows an example listing of automation plan configuration files 1502 for implementing the automation plans 128 of FIGS. 1 and 2 that may be selected by the customer user 204 to customize different deployments (e.g., the SDDC 202 and/or the virtual appliances 224a-c of FIG. 2). The configuration files 1502 of the illustrated example include top-level automation plans 1504 for selection by users via, for example, the deployment model selection user interface control 602 of FIG. 6. In the illustrated example, each automation plan has one or more corresponding JSON files with ".json" file extensions and one or more corresponding properties files with ".properties" file extensions. The configuration files having ".json" file extensions in the illustrated example store lists of product components selectable by a customer for customizing a deployment. Also, configuration files having ".properties" file extensions store properties that are needed to configure user-configurable parameters in corresponding automation plans. The automation plan configuration files 1502 of the illustrated example also include failover site automation plans 1506 that may be used by customers to customize deployments of failover sites.

In the illustrated example, the automation plan configuration files 1502 are developed based on VMware Validated Design (VVD) deployment configurations which are architectures created and validated by VMware, Inc. to encompass an entire product stack used in, for example, an SDDC deployment. However, the automation plan configuration files 1502 maybe developed based on any other type of deployment configuration. In addition, although the automation plan configuration files 1502 are shown as JSON configuration files, any other type of configuration files may be used.

Figure 16:
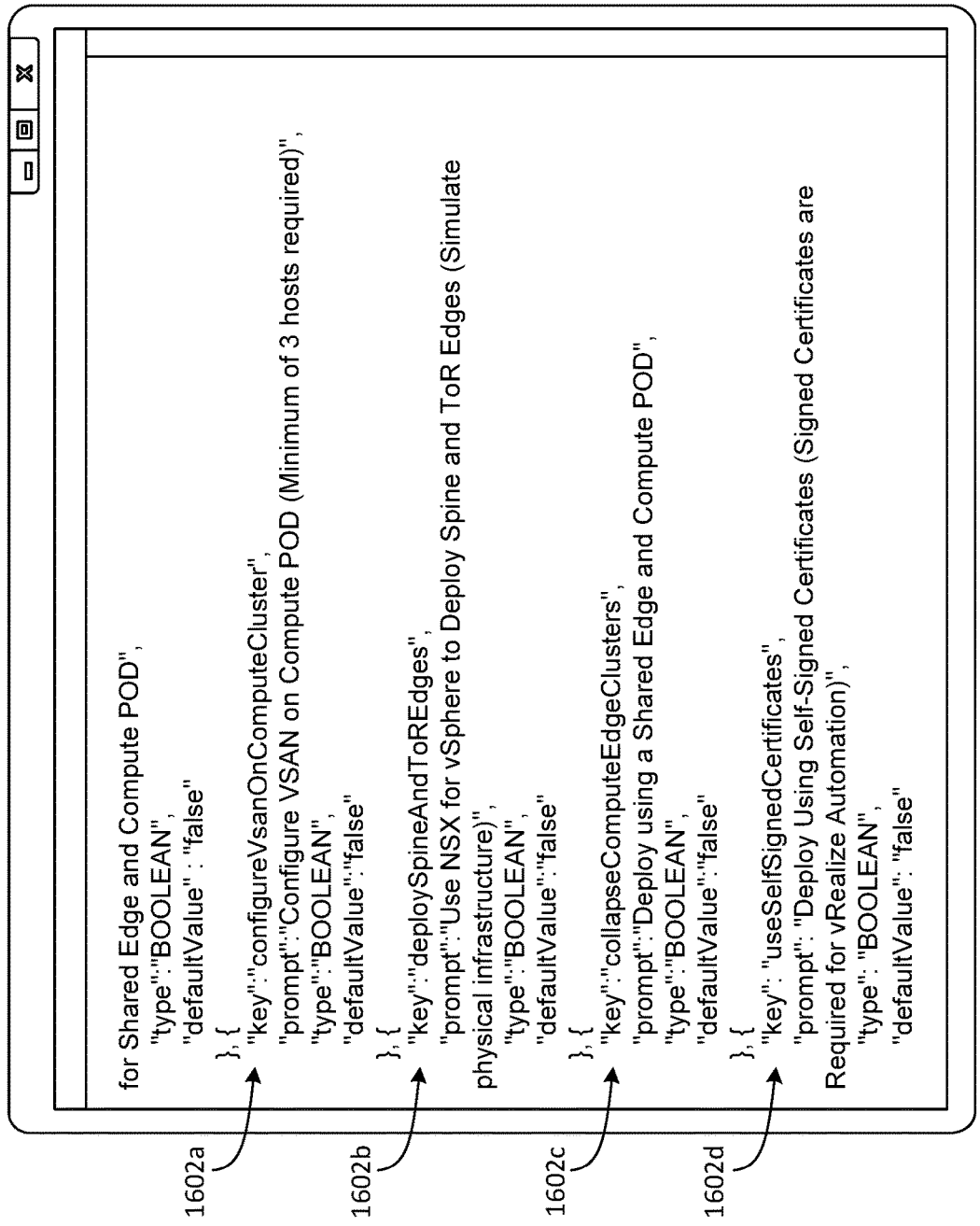
FIG. 16 shows example programing language in an automation plan configuration file to define user-configurable parameters.

FIG. 16 shows example programing language in an automation plan configuration file (e.g., a configuration file of one of the automation plans 128 of FIGS. 1 and 2) to define user-configurable parameters 1602a-d for displaying via one or more of the example user interfaces of FIGS. 5-8 to allow the customer user 204 to provide user-provided parameter values for customizing deployments via the user-configurable parameters 1602a-d. In the illustrated example, each user-configurable parameter 1602a-d is provided with a "key" property that defines the variable name to reference that user-configurable parameter 1602a-d throughout programming statements of the automation plan configuration files 1502 (FIG. 15). For example, the "key" of the user-configurable parameters 1602a defines "configureVsanOnComputerCluster" as a variable name. Each user-configurable parameter 1602a-d is also provided with a "prompt" property to define the text that will be displayed via one or more of the example user interfaces of FIGS. 5-8 to prompt for corresponding user-provided parameter values from the customer user 204. For example, the "prompt" property of the user-configurable parameters 1602a specifies the text "Configure VSAN on Compute POD (Minimum of 3 hosts required)" which is displayed in the example run parameters configuration user interface 800 of FIG. 8 at reference numeral 1604. Each user-configurable parameter 1602a-d is also provided with a "type" property to define the data type of the corresponding user-provided parameter value to be provided by the customer user 204. Each user-configurable parameter 1602a-d is also provided with a "defaultValue" property that defines a default parameter value for the corresponding user-configurable parameter if the customer user 204 does not provide a user-provided parameter value.

Figure 17:
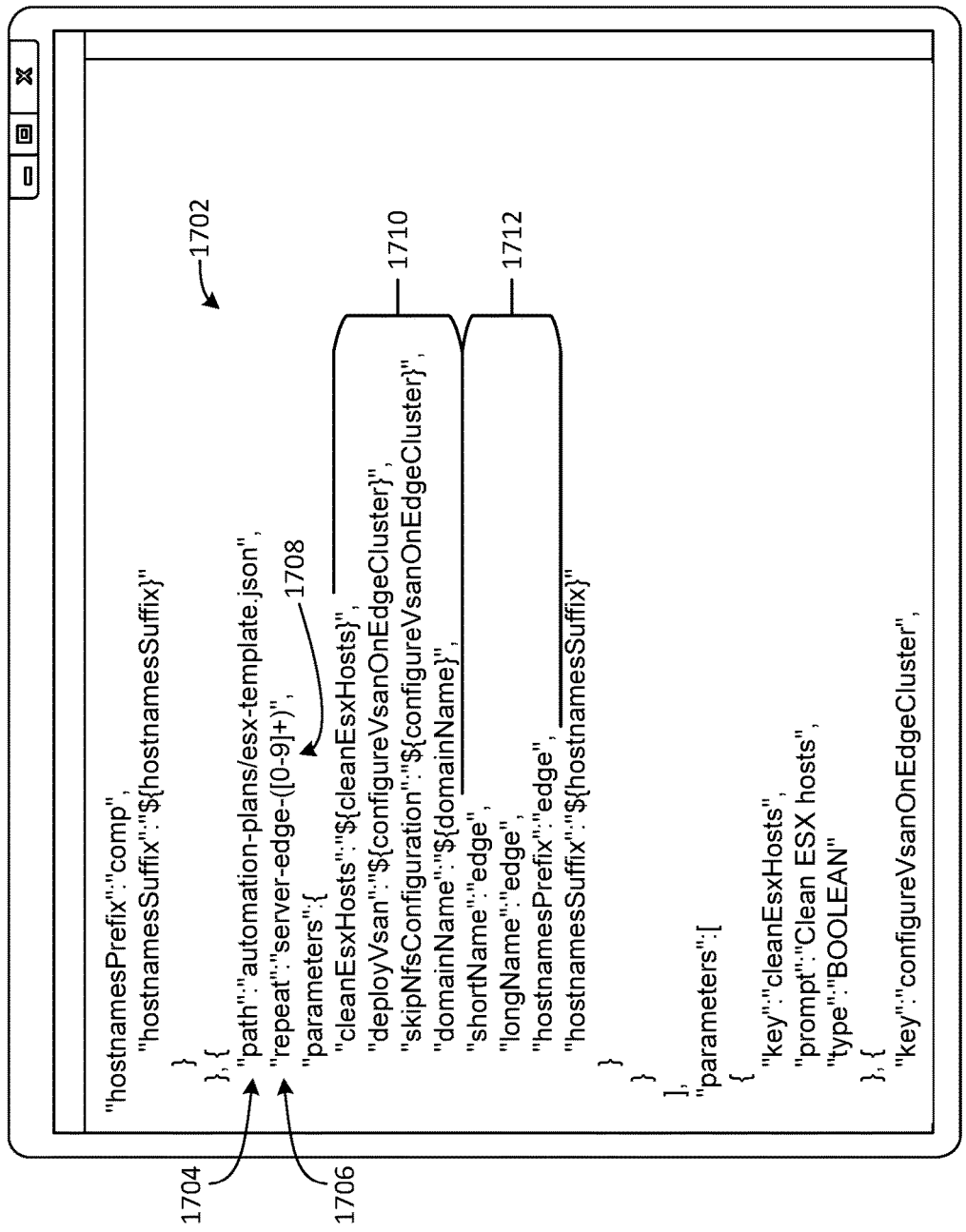
FIG. 17 shows example programming language in an automation plan configuration file that may be used to define resources as inputs to tasks.

FIG. 17 shows example programming language that implements a resource definition 1702 in an automation plan configuration file (e.g., a configuration file of one of the automation plans 128 of FIGS. 1 and 2) that may be used to define resources as inputs to tasks. In the illustrated example, the resource to be created is a VMware ESX® server resource. An example "path" property 1704 of the resource to be defined indicates the path or configuration file for a corresponding automation plan to be imported as "automation-plans/esx-template.json." The resource definition of the illustrated example includes a "repeat" property 1706 which enables creating multiple ones of the resource in a scalable manner. For example, the "repeat" property 1706 provides scalability by adjusting the number of corresponding resources (e.g., multiple instances of the VMware ESX® server resource) to be created as a number of times to import a corresponding automation plan 128 based on a user-provided parameter value. In this manner, the customer user 204 can specify the number of the same type of resources to be created through a user-provided parameter value without needing to edit and recompile the automation plans 128. In the illustrated example, the "repeat" property 1706 is defined as "server-edge-([0-9]+)" to serve as an example resource search string 1708 that is used to compare to a listing of resource instance IDs of available resources. In this manner, the example resource search string 1708 can be used to find any matching group of resources that have "server-edge" followed by any numerical value (e.g., [0-9]) in their instance IDs.

The example resource definition 1702 of FIG. 17 also includes example user-configurable parameters 1710 that may be defined based on user-provided parameter values provided by the customer user 204 via one or more of the example user interfaces of FIGS. 5-8. The example resource definition 1702 of FIG. 17 also includes example fixed parameters 1712 that are provided with values during an automation plan preparation phase (e.g., the automation plan preparation phase of FIG. 11) and are not user-configurable by a customer. In the illustrated example, the user-configurable parameters 1710 are flagged or tagged using a leading dollar sign ($) and curly brackets or braces ({ . . . }), which identify the user-configurable parameters 1710 as being user-configurable by a customer (e.g., the customer user 204). In other examples, any other types of flagging or tagging may be used to denote user-configurable parameters. In the illustrated example, the fixed parameters 1712 are defined without the example flagging or tagging of the leading dollar sign ($) and curly brackets ({ . . . }). In this manner, the fixed parameters 1712 are identified as not being user-configurable by a customer (e.g., the customer user 204). For example, a user-configurable parameter 1710 labeled "domainName" is defined as "${domainName}" which includes the leading dollar sign ($) and curly brackets ({ . . . }) to denote a user-configurable parameter, and a fixed parameter 1712 labeled "sortName" is defined as "edge" and omits the leading dollar sign ($) and curly brackets ({ . . . }) to denote a fixed, non-user-configurable parameter. The user-provided parameter values for the user-configurable parameters 1710 may be defined at any suitable time during a customer customization phase of an automation plan (e.g., the automation execution phase of FIGS. 12A and 12B) and used throughout any resource or task definition that refers to those user-configurable parameters 1710. In this manner, the customer user 204 need not provide the same user-provided value for each user-configurable parameter 1710 each time it is referenced in an automation plan.

Figure 18:
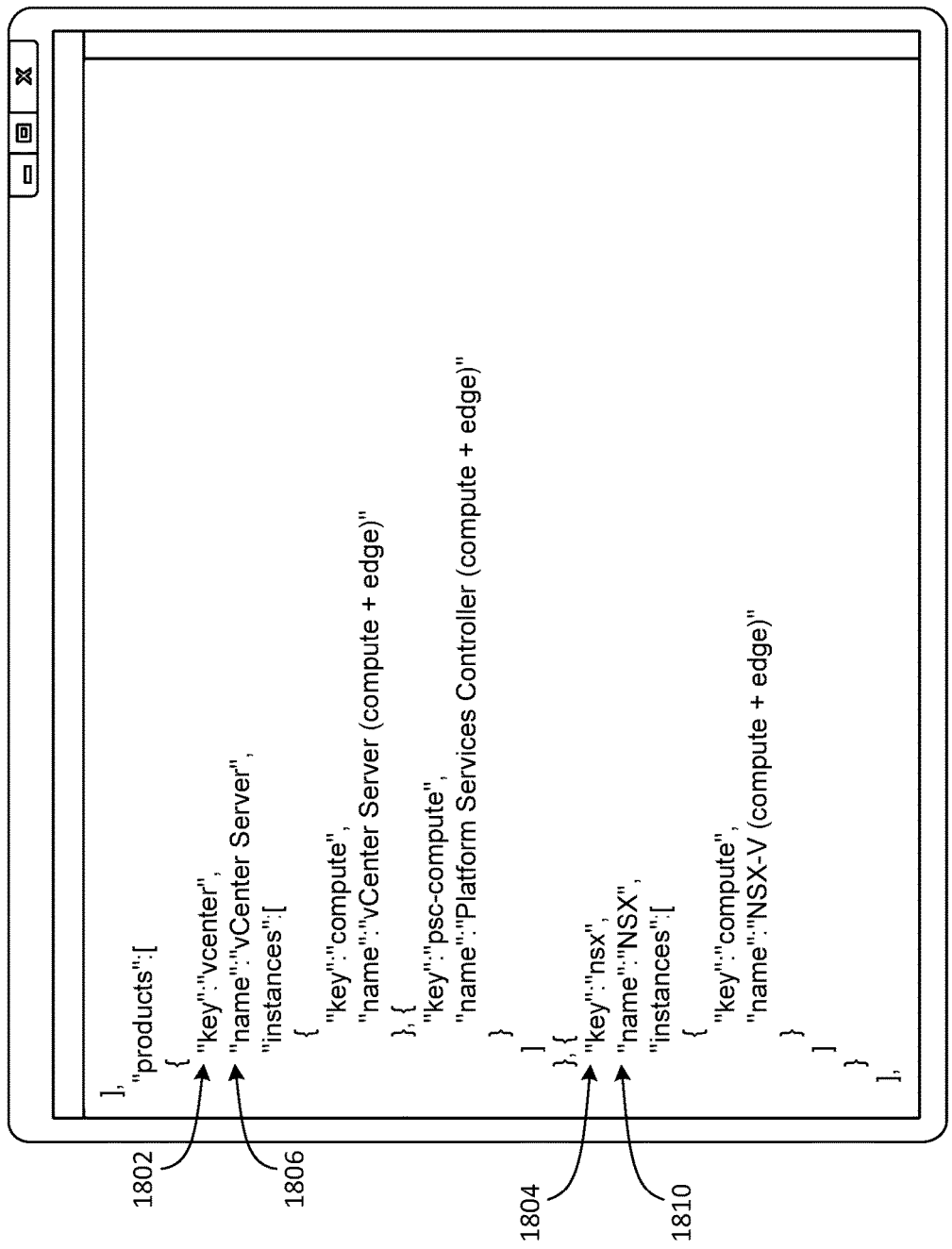
FIG. 18 shows an example programming language in an automation plan configuration file including user-selectable components or products for customizing a deployment.

FIG. 18 shows an example programming language in an automation plan configuration file (e.g., a configuration file of one of the automation plans 128 of FIGS. 1 and 2) including user-selectable components or products (e.g., the virtual environment infrastructure 208, the network virtualizer 210, the virtual storage area network 212, the operations manager 228, the automation manager 230, or the site recovery manager 232 of FIG. 2) for customizing a deployment. The example programming statements of the illustrated example of FIG. 18 include an example "vcenter" component definition 1802 and an example "nsx" component definition 1804. In some examples, the example "vcenter" component definition 1802 may be used to implement the services server 216 of the core components 206 of FIG. 2. In some examples, the example "nsx" component definition 1804 may be used to implement the network virtualizer 210 of the core components 206 of FIG. 2. The example programming statements of FIG. 18 cause a corresponding automation plan 128 to display the defined component or product names via a user interface for customization by the customer user 204. For example, the "vcenter" component definition 1802 includes a "name" property 1806 defined as "vCenter Server" that is displayed in the example product selection user interface 700 of FIG. 7 as UI label "vCenter Server" indicated by reference numeral 1808. In addition, the example "nsx" component definition 1804 includes a "name" property 1810 defined as "NSX" that is displayed in the example product selection user interface 700 of FIG. 7 as UI label "NSX" indicated by reference numeral 1812.

Figure 19:
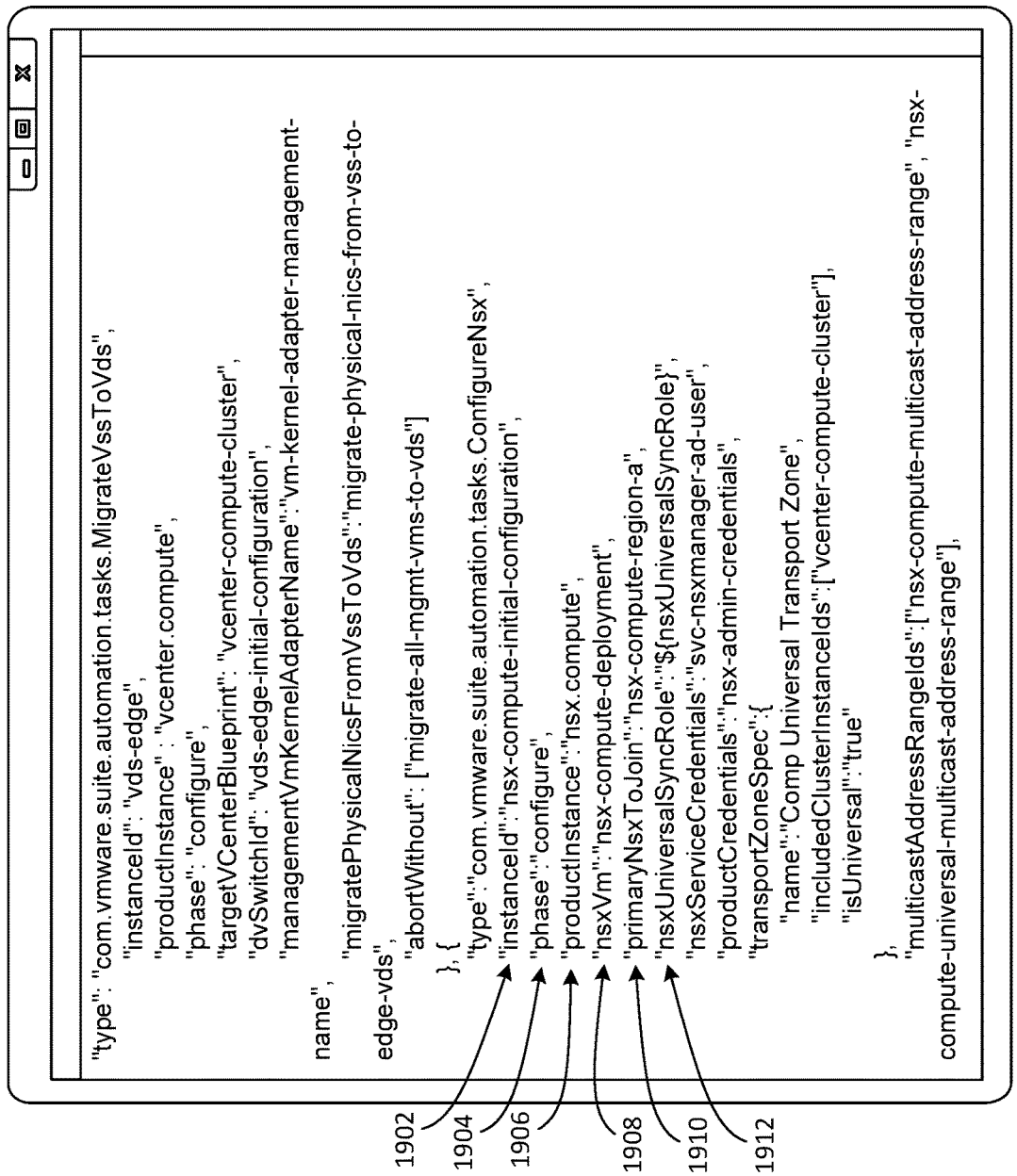
FIG. 19 shows example programming language in an automation plan configuration file that may be used to define a task.

FIG. 19 shows example programming language in an automation plan configuration file (e.g., a configuration file of one of the automation plans 128 of FIGS. 1 and 2) that may be used to define a task. The task defined by the programming statements of the illustrated example of FIG. 19 is configured to create a resource instance of an NSX manager (e.g., an instance of the network virtualizer 210 of FIG. 2). The example task definition of FIG. 19 includes an example instance ID ("instanceID") property 1902 which is used to provide a unique identifier for each resource instance created by the task. An example phase property 1904 is used to define a phase (e.g., a lifecycle phase such as a configuration phase) of a deployment in which the task definition is to be executed. An example product instance ("productInstance") property 1906 is used to associate the resource created by the task with a corresponding name.instance key (e.g., "nsx.compute") of a component or product identified by the customer user 204 via a user-provided parameter value. An example file property 1908 (e.g., "nsxVm") defines an input resource for the task that is a configuration file modifiable by the customer user 204 to change the execution order of different tasks in the automation plan that includes the task definition of FIG. 19. For example, a customer may want to customize an overall automation plan in a manner not available via a user interface (e.g., one of the user interfaces of FIGS. 5-8). In some examples, the customer user 204 may modify a configuration file to delete a vCenter server instance (e.g., an instance of the services server 216 of FIG. 2) from being configurable via a user interface. In this manner, the customer user 204 may change the topology of a deployment by directly editing the configuration file. For example, if an automation plan 128 is designed to provide two vCenter servers, the customer user 204 may delete a resource definition of one of the vCenter server instances in the configuration file identified by the file property 1908. In this manner, only one vCenter server instance is subsequently configurable for the corresponding automation plan via a user interface.

The example of FIG. 19 also shows an input resource property definition 1910 that defines another resource to be an input for the defined task. The example resource property definition 1910 defines a network region resource that is to be used to create the NSX network virtualizer resource. The example of FIG. 19 also shows a user-configurable parameter 1912 to customize a Universal Sync Role feature of the resource to be created based on a user-provided parameter value to be provided by the customer user 204 for the user-configurable parameter 1912.

FIG. 20 shows example programming language in an automation plan configuration file (e.g., a configuration file of one of the automation plans 128 of FIGS. 1 and 2) that defines graphical user interface controls and default values to specify parameter values for user-configurable parameters. For example, text box user interface control definition 2002 defines information to be displayed for a text box user interface control to receive the name of a domain ("domainName") via a user-provided parameter value from the customer user 204. The illustrated example of FIG. 20 also shows default value definitions 2004 that set default values for corresponding user-configurable parameters. In this manner, if the customer user 204 does not provide user-provided parameter values for those user-configurable parameters, the default values set by the default value definitions 2004 will be used by default for the user-configurable parameters.

Figure 21:
FIG. 21 shows example programming language in an automation plan configuration file to identify a plurality of tasks as part of a set or group of tasks via a single user-configurable parameter that is selectable to specify a component or product to include in a deployment using the plurality of tasks.

FIG. 21 shows example programming language in an automation plan configuration file (e.g., a configuration file of one of the automation plans 128 of FIGS. 1 and 2) that includes a user-configurable tasks-by-group parameter definition 2102 to identify a plurality of tasks as part of a set or group of tasks via a single example user-configurable parameter. In the illustrated example, the user-configurable tasks-by-group parameter definition 2102 is selectable by a user to specify a component or product to include in a deployment using the plurality of tasks defined in the user-configurable tasks-by-group parameter definition 2102. For example, the customer user 204 can select a user-configurable tasks-by-group parameter defining a plurality of tasks to configure a VMware Network File System (NFS) data store resource or can select a different user-configurable tasks-by-group parameter defining a plurality of tasks to configure a VMware vSAN data store resource. As another example, the customer user 204 can select a user-configurable tasks-by-group parameter defining a plurality of tasks to configure an embedded automation plan or can select a user-configurable tasks-by-group parameter defining a plurality of tasks to configure a cluster automation plan.

Figure 22:
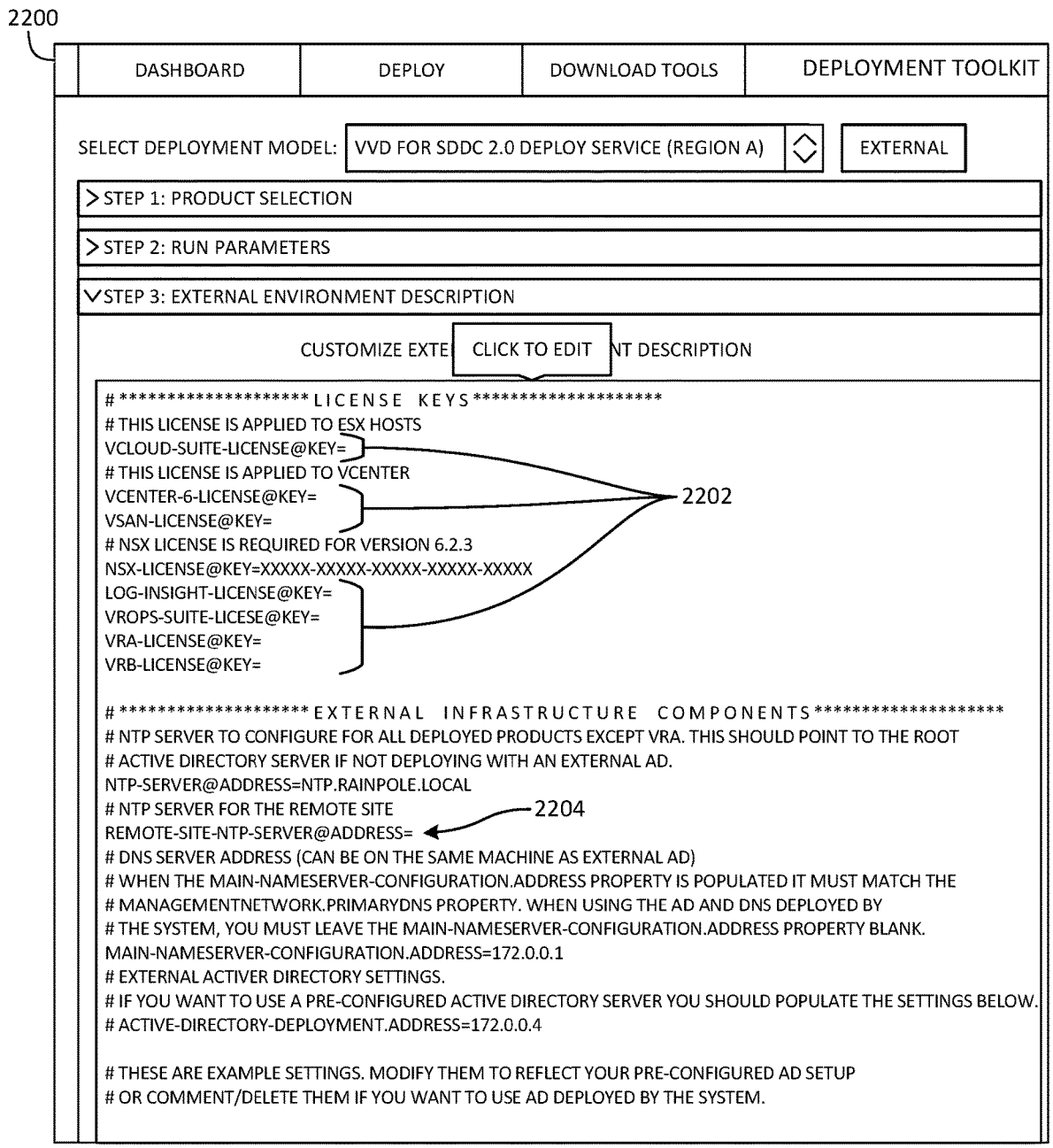
FIG. 22 shows an example user interface to enable user-entry of values for resource properties to build a corresponding resource input list for a deployment.

FIG. 22 shows an example user interface 2200 to enable user-entry of values for resource properties to build a corresponding resource input list for a deployment. In the illustrated example, a plurality of user-configurable license parameters 2202 via which a corresponding automation plan can receive product or component license keys via user-provided parameter values from the customer user 204 to specify corresponding components or products from which to build resource input lists for a deployment. The illustrated example of FIG. 22 also shows an example external infrastructure component user-configurable parameter 2204 via which the corresponding automation plan can receive an Internet protocol (IP) address of a remote site server with which the deployment is to communicate.

From the foregoing, it will be appreciated that the above disclosed methods, apparatus and articles of manufacture provide a higher-level DSL for use by customers to more quickly and more easily deploy and configure SDDCs and/or virtual appliances using higher-level primitives, programming components, or building blocks than available from prior lower-level DSLs. For example, instead of customers needing to code thousands of LOCs to define a product deployment, examples disclosed herein enable customers to specify product deployments using higher-level primitives, programming components, or building blocks. Use of such a higher-level DSL via automation plans as disclosed herein decreases the amount of time required for a host server node to deploy an SDDC and/or virtual appliances. For example, using customizable automation plans as disclosed herein, a customer can complete a deployment to full running status in 9 hours or, in some instances, as few as 3-5 hours, which are significantly shorter deployment times than the longer deployment times of 30-40 days associated with manual deployments. Automation plans based on a higher-level DSL, as disclosed herein, also require less user involvement and less programming expertise by a customer when preparing a product deployment. In addition, the more-efficient ordering and execution of tasks for deploying SDDCs and/or virtual appliances achieved using examples disclosed herein result in consuming less computing power and resources. This is a significant improvement over prior deployment techniques that customers use for deployment design that involve trial and error approaches. In such trial and error approaches, deployment processes start and stop numerous times when errors are encountered (e.g., due to unforeseen inter-task dependencies, unavailable resources, etc.). Such starting and stopping lead to significant inefficiencies over time related to consuming significant amounts of computing power and computing resources. Using automation plans as disclosed herein significantly reduces or eliminates inefficiencies of prior deployment techniques by providing more-efficient task execution schedules for deployments that are generated to exclude unnecessary tasks for target deployments, generated to execute tasks in parallel when such opportunities exist, and generated to be consistent with inter-task dependencies so that dependency errors are decreased or eliminated during deployment processes.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system to automate user deployment of a software defined data center based on an automation plan generated by a service provider and accessible by a user, the system comprising:
   memory;
   programmable circuitry;
   instructions in the system to program the programmable circuitry to:
      generate a task list based on the automation plan and user-provided parameter values;
      determine dependencies between tasks in the task list prior to executing the tasks;
      identify first and second tasks in the task list, the first task to allocate a resource, the second task to execute after the resource is allocated;
      configure a third task in the task list to allocate the resource before the first task to remove a first dependency of the second task on the first task;
      rearrange an execution order of the tasks in the task list by changing a second dependency between the tasks in the task list when at least one of the tasks is unnecessary to deploy the software defined data center;
      associate user-provided parameter values for user-configurable parameters with corresponding ones of the tasks from the task list;
      generate an execution schedule based on the dependencies, at least some of the tasks in the task list, task metadata, and the user-provided parameter values, the execution schedule to alter execution of the automation plan to modify deployment of the software defined data center without recompiling the automation plan; and
      execute the at least some of the tasks in the task list based on the execution schedule to deploy the software defined data center.

2. The system of claim 1, wherein the programmable circuitry is to generate the task list without receiving any line of code via any user input from the user.

3. The system of claim 1, wherein the automation plan is generated by the service provider independent of a need of a customer to deploy the software defined data center, and the automation plan is to be subsequently accessible by the customer when the customer is to deploy the software defined data center.

4. The system of claim 1, wherein the programmable circuitry is to access the automation plan as a pre-prepared automation plan before the task list is generated, the task list based on the user-provided parameter values without receiving any line of code via any user input for the pre-prepared automation plan after accessing the pre-prepared automation plan.

5. The system of claim 1, wherein the programmable circuitry is to coordinate execution of the at least some of the tasks in the task list by a server node to automatically deploy the software defined data center.

6. The system of claim 1, wherein the automation plan is to configure a virtual appliance, and the programmable circuitry is to execute a fourth task from the task list corresponding to a second automation plan to configure core components of the software defined data center, the core components including a hypervisor, a network virtualizer, and a virtual storage area network.

7. The system of claim 1, wherein the programmable circuitry is to facilitate partial execution of a virtual infrastructure deployment of the software defined data center, the partial execution to execute the automation plan for a duration of a first lifecycle phase and cease execution of the automation plan when a second lifecycle phase is reached.

8. At least one non-transitory computer readable medium comprising instructions to automate user deployment of a software defined data center based on an automation plan generated by a service provider and accessible by a user, the instructions, when executed, cause programmable circuitry to at least:
generate a task list based on the automation plan and a user-provided parameter value;
determine dependencies between tasks in the task list prior to executing the tasks;
identify first and second tasks in the task list, the first task to allocate a resource, the second task to execute after the resource is allocated;
configure a third task in the task list to allocate the resource, the third task to execute before the first task to remove a first dependency of the second task on the first task;
rearrange an execution order of the tasks in the task list by changing a second dependency between the tasks in the task list when at least one of the tasks is unnecessary to deploy the software defined data center;
associate the user-provided parameter value for a user-configurable parameter with a corresponding one of the tasks from the task list;
generate an execution schedule based on the dependencies, at least some of the tasks in the task list, task metadata, and the user-provided parameter value, the execution schedule to alter execution of the automation plan to modify deployment of the software defined data center without recompiling the automation plan; and
execute the at least some of the tasks in the task list based on the execution schedule to deploy the software defined data center.

9. The at least one non-transitory computer readable medium of claim 8, wherein the instructions are further to cause the programmable circuitry to generate the task list without receiving any line of code via any user input from the user.

10. The at least one non-transitory computer readable medium of claim 9, wherein the instructions are further to cause the programmable circuitry to access the automation plan as a pre-prepared automation plan before generating the task list, the task list based on the user-provided parameter value without receiving any line of code via any user input for the pre-prepared automation plan after accessing the pre-prepared automation plan.

11. The at least one non-transitory computer readable medium of claim 8, wherein the instructions are to cause the programmable circuitry to generate the execution schedule and execute the tasks in the task list at a single server node.

12. The at least one non-transitory computer readable medium of claim 8, wherein the automation plan is to configure a virtual appliance, and the instructions are further to cause the programmable circuitry to execute a fourth task from the task list corresponding to a second automation plan to configure core components of the software defined data center, the core components including a hypervisor, a network virtualizer, and a virtual storage area network.

13. The at least one non-transitory computer readable medium of claim 8, wherein the instructions are further to cause the programmable circuitry to coordinate execution of the at least some of the tasks in the task list by a server node to automatically deploy the software defined data center.

14. The non-transitory computer readable medium of claim 8, wherein the instructions are to cause the programmable circuitry to facilitate partial execution of the automation plan, the partial execution to execute the automation plan to deploy the software defined data center and cease execution of the automation plan before configuration of the software defined data center.

15. A method to automate user deployment of a software defined data center based on an automation plan generated by a service provider and accessible by a user, the method comprising:
generating, by executing a first instruction of machine-executable instructions with programmable circuitry, a task list based on the automation plan and user-provided parameter values;
determining, by executing a second instruction of the machine-executable instructions with the programmable circuitry, dependencies between tasks in the task list prior to executing the tasks;
identifying, by executing a third instruction of the machine-executable instructions with the programmable circuitry, first and second tasks in the task list, the first task to allocate a resource, the second task to execute after the resource is allocated;
configuring, by executing a fourth instruction of the machine-executable instructions with the programmable circuitry, a third task in the task list to allocate the resource, the third task to execute before the first task to remove a first dependency of the second task on the first task;
rearranging, by executing a fifth instruction of the machine-executable instructions with the programmable circuitry, an execution order of the tasks in the task list by changing a second dependency between the tasks in the task list when at least one of the tasks is unnecessary to deploy the software defined data center;
associating, by executing a sixth instruction of the machine-executable instructions with the programmable circuitry, the user-provided parameter values for user-configurable parameters with corresponding tasks from the task list;
generating, by executing a seventh instruction of the machine-executable instructions with the programmable circuitry, an execution schedule based on the dependencies, at least some of the tasks in the task list, task metadata, and the user-provided parameter values, the execution schedule to alter execution of the automation plan to modify deployment of the software defined data center without recompiling the automation plan; and executing, with the programmable circuitry, the at least some of the tasks in the task list based on the execution schedule to deploy the software defined data center.

16. The method of claim 15, wherein the automation plan includes compiled second machine-executable instructions.

17. The method of claim 15, further including generating the task list without receiving any line of code via any user input from the user.

18. The method of claim 15, wherein the automation plan is generated by the service provider independent of a need of a customer to deploy the software defined data center, and the automation plan is to be subsequently accessible by the customer when the customer is to deploy the software defined data center.

19. The method of claim 15, further including coordinating execution of the at least some of the tasks in the task list by a server node to automatically deploy the software defined data center.

20. The method of claim 15, wherein the automation plan is to configure a virtual appliance, and further including executing a fourth task from the task list corresponding to a second automation plan to configure core components of the software defined data center, the core components including a hypervisor, a network virtualizer, and a virtual storage area network.

21. The method of claim 15, further including accessing, responsive to a request by the user, the automation plan from a plan repository.

22. The method of claim 15, further including facilitating partial execution of the automation plan during deployment of the software defined data center, the partial execution to execute the automation plan for a duration of a first lifecycle phase and cease execution of the automation plan when a second lifecycle phase is reached.

* * * * *